United States Patent [19]

Walker

[11] Patent Number: 4,661,549

[45] Date of Patent: Apr. 28, 1987

[54] GRAFT POLYMERS OF POLYMERIZABLE MONOMERS AND OLEFIN POLYMERS

[75] Inventor: Leigh E. Walker, Lewiston, N.Y.

[73] Assignee: Occidental Chemical Corporation, Niagara Falls, N.Y.

[21] Appl. No.: 541,191

[22] Filed: Oct. 12, 1983

[51] Int. Cl.[4] .................. C08L 51/06; C08L 23/28; C08F 255/00; C08F 255/02

[52] U.S. Cl. ................... 524/397; 525/97; 525/98; 525/193; 525/314; 525/313; 525/315; 525/317; 525/290; 525/70; 525/71; 525/75; 525/86; 525/87; 525/285; 525/309; 525/310; 524/504; 524/527; 524/528; 524/536

[58] Field of Search ............ 525/75, 87, 70, 290, 525/317, 97, 98, 193; 524/397

[56] References Cited

U.S. PATENT DOCUMENTS

| 3,642,950 | 2/1972 | O'Shea | 525/290 |
|---|---|---|---|
| 3,789,083 | 1/1974 | Dumoulin et al. | 525/317 |
| 3,790,644 | 2/1974 | Obsomer | 260/876 |
| 3,975,458 | 8/1976 | Severini et al. | 525/211 |
| 4,071,582 | 1/1978 | Takahashi | 525/310 |
| 4,163,033 | 7/1979 | Takahashi | 525/319 |
| 4,195,137 | 3/1980 | Walker | 525/290 |

FOREIGN PATENT DOCUMENTS

| 649328 | 12/1964 | Belgium . |
| 0007167 | 1/1980 | European Pat. Off. . |
| 0049595 | 4/1982 | European Pat. Off. . |
| 1445405 | 5/1966 | France . |
| 2097432 | 3/1972 | France . |
| 2149239 | 3/1973 | France . |
| 58-91716 | 5/1983 | Japan . |
| 832700 | 4/1960 | United Kingdom . |

*Primary Examiner*—Carman J. Seccuro
*Attorney, Agent, or Firm*—James F. Tao; James F. Mudd

[57] ABSTRACT

Graft polymers are prepared by reacting an ethylenically unsaturated polymerizable monomer with a polymer of an olefin of 2 to about 8 carbon atoms in a process wherein the olefin polymer is substantially insoluble in the monomer but is capable of absorbing the monomer. In a preferred aspect, a vinyl halide polyolefin graft polymer is produced by reacting a solid polyolefin particle with a vinyl halide monomer in which the polyolefin is substantially insoluble, but is capable of absorbing the monomer. The solid particles can be contacted with the monomer in one step or in stages. When the stage-wise reaction is continued until the proportion of polyolefin in the polymer product is about 2 to about 20 weight percent, the resulting product can be formed to a transparent or translucent article. When a small proportion of solid polyolefin is employed in the polymerization process, both a graft polymer and a polymer of the unsaturated monomer are simultaneously produced in the same reactor and can be readily mechanically separated into the individual products.

91 Claims, No Drawings

GRAFT POLYMERS OF POLYMERIZABLE MONOMERS AND OLEFIN POLYMERS

BACKGROUND OF THE INVENTION

Polymers with excellent impact strength at ambient and very low temperatures are prepared by the polymerization in bulk liquid phase of a vinyl halide monomer and an olefin trunk polymer of hydrocarbon olefin monomers. The preparation of such polymers is disclosed in detail in U.S. Pat. Nos. 4,071,582; 4,163,033 and 4,169,870, to Takahashi, the disclosures of which are incorporated herein by reference.

The process described in the above-mentioned patents is primarily used at lower proportions of the polyolefin component, up to about 20 weight percent, and preferably up to about 10 weight percent. In the polymerization process, the reaction commences with the polyolefin component in solution or partial solution or dispersed in the vinyl monomer. As the reaction proceeds, the reaction mixture thickens to a latex-like consistency. As the conversion progresses, the reaction mixture enters the "paste stage" where it has a dough like consistency. Near the end of the reaction, the polymer mass in the reactor breaks up into discrete particles, which are recovered as the final product. In this process, when the polyolefin component is employed at higher proportions, and when the reaction proceeds to the higher conversions, the reaction product in the thick paste stage does not readily break down into particles. Accordingly, the process is not ordinarily used at proportions higher than about 20 weight percent of the polyolefin component.

The preparation of graft copolymers of unsaturated monomers and polyolefins is also disclosed in U.S. Pat. Nos. 3,489,821 and 3,489,822 to Witt et al. While these patents disclose the reaction of higher proportions of polyolefin, there is no enabling disclosure of the reaction being carried out in the bulk liquid phase. Thus, the patentees do not disclose the above described difficulty with respect to breakdown of the reaction mass from a dough-like consistency to discrete particles.

U.S. Pat. No. 3,408,424 to Barkhuff discloses the reaction of vinyl chloride with polyolefins at higher proportions, but the enabling disclosure of this patent is limited to the suspension process and there is no teaching with respect to the bulk liquid phase process. Therefore, the patentees do not disclose encountering the above-described problem with breakdown of a dough-like mass into discrete particles. Barkhuff at col. 5, line 71, teaches that grafting can occur to particles of polyolefin if finely suspended even if not fully dissolved, but he further points out that large rubbery lumps will be evident in the product if dispersing conditions are such as to give more than a small amount of polyolefin in this form.

More recently, in U.S. Pat. No. 3,978,162 to Nakanishi, the patentees were still attempting to react polyolefins at higher proportions in a suspension polymerization process much like in the just-described Barkhuff patent.

Severini et al. in U.S. Pat. No. 4,001,349 teach grafting styrene onto an ethylene, propylene, diene modified polymer (EPDM) in a process carried out in aqueous phase for at least part of the reaction. However, the patentees disclose dissolving the EPDM in the styrene monomer and reacting at higher temperatures at the beginning of the process. Likewise, Founier et al U.S. Pat. No. 4,166,081 and Hardt et al U.S. Pat. Nos. 4,276,391 and 4,054,613 teach preparation of polyolefin graft copolymers in solution at higher temperatures and then recovering the products from the solvent.

Lee in U.S. Pat. No. 4,098,734 teaches making graft polymer by dissolving a polybutadiene in monomers then carrying out a reaction in the usual way, eg, suspension, emulsion, bulk or combinations. He teaches that some polybutadiene crosslinks can be used but points out that this may interfere with the required dissolving of the polybutadiene.

Beati et al at J. Applied Polymer Science, Vol. 26, 2185–2195 (1981) disclose reacting methyl methacrylate to an EPR or EPDM rubber in a process in which the EPDM is dissolved. Thereafter the mixture is suspended, the solvent is removed and the monomer is added to form the polymer.

Rademacher in U.S. Pat. No. 3,347,956 teaches a process to convert low density polyethylene into a very fine dispersion in vinyl chloride by heating to a high temperature under agitation and then cooling to form a dispersion of polyethylene in vinyl chloride where the particles have sizes in the 10-200 micron range (col. 4, line 73), more preferaby 10-50 microns, and have large surface area. It is not clear whether a uniform graft polymer is made, or whether only a surface reaction occurs. But the patent clearly does not teach that grafting can occur within a large particle, as in the present invention.

Fisher et al. [J. Pol. Sci. Pol. Sym. 66, 443 (1979)] recognize the possibility of reacting ethylenically unsaturated monomers having polar groups such as ester, nitrile, amino, phenyl, ether, and the like, with the surface of polyolefins such as polyethylene, polypropylene and EPDMs in the forms of beads, films, fibres and tubing using monomer, and optionally a swelling agent, with high energy irradiation to surface polymerize or graft to the substrate. Other references to surface reaction (Japan 73/23,357) and a swollen polymer matrix [(Dokl Arad Nauk SSR 229 394 (1976)] have also recognized the possibility of polymerizing on or near the surface of particles or objects. However, they do not disclose or suggest the possibility of absorbing initiator and monomer throughout the particle and polymerizing throughout said particle to make a homogeneous product.

Thus, the prior art teaches making graft copolymers at high proportions of polyolefin but requires that the polyolefin be dissolved in a monomer and the mixture then either be suspended, emulsified or that a solution process take place at a high temperature to give the product. Other art teaches reaction on the surface of particles. The idea of absorption of monomer and initiator into particles which are not soluble in the monomer followed by reaction of the monomer in the particles to give polymer and graft copolymer, which is the subject of this invention, has not been disclosed previously.

SUMMARY OF THE INVENTION

The process of the present invention enables the reaction of higher proporations of olefin polymers with ethylenically unsaturated polymerizable monomers to produce highly desirable graft polymers in particulate form. The process can be carried out without the need for a solvent or a carrier medium.

In accordance with one aspect of the invention, an ethylenically unsaturated polymerizable monomer is reacted with the polymer of an olefin of 2 to about 8 carbon atoms in a process wherein the olefin polymer is substantially insoluble in the monomer but is capable of absorbing the monomer. The process is truly remarkable in that solid particles of the olefin polymer are contacted with the monomer in liquid phase, the monomer is absorbed into the polymer particles and the polymerization occurs within the solid particles which are transformed into particles of reaction product.

In another aspect of the invention, a vinyl halide polyolefin graft polymer is produced by reacting a solid polyolefin particle comprising a polymer of an olefin of 2 to about 8 carbon atoms, preferably a polyolefin of an aliphatic hydrocarbon olefin of 2 to about 8 carbon atoms with a vinyl halide monomer either alone or in combination with up to 50 percent by weight based on the total weight of monomer of an ethylenically unsaturated compound copolymerizable therewith. In this process, the olefin polymer is substantially insoluble in the monomer, but is capable of absorbing the monomer.

The process of the invention is particularly useful for reacting polyolefins in a proportion of about 20 to about 80 weight percent based on the weight of the reactive monomer, although higher and lower proportions can be used. The preferred proportion is about 30 to about 50 weight percent of polyolefin based on the weight of the reactive monomer.

The products of the invention are advantageously prepared in a mass polymerization, but can also be prepared in the presence of an inert diluent, such as water.

In still another aspect of the invention, the solid particles of polyolefin are contacted with liquid monomer in stages, rather than contacting all of the solid polyolefin with all of the liquid monomer in one step.

It has been surprisingly found that when the stagewise reaction of liquid monomer for the solid polyolefin is continued until the proportion of the polyolefin in said polymer is about 2 to about 20 weight percent, preferably about 5 to about 10 weight percent based on the weight of the monomer, the resulting product can be molded to form transparent or translucent molded articles.

In still another aspect of the invention, a small proportion of solid polyolefin, in the range of about 0.1 to about 5 weight percent based on the weight of monomer is employed in the polymerization process so that both the graft polymer and a polymer of the ethylenically unsaturated monomer are produced simultaneously in the same reactor. The solid polyolefin particles are transformed into graft polymer. The polymer of the ethylenically unsaturated monomer forms as a finely divided powder which can be readily separated from the particles of the graft polymer to provide two distinct products from one reaction vessel.

The processes of the invention have many advantages over the prior art:
(a) By the use of pre-formed polyolefin particles or pellets, in solid form, no grinding and/or dissolving of the polyolefin reactant is required.
(b) The polyolefin particles can be reused in a subsequent reaction in the event that for some reason the reaction does not proceed the first time. This feature can also be used to modify the proportions of polyolefin and reacted monomer after an initial reaction.
(c) Graft polymer and a homopolymer of an ethylenically unsaturated compound can be made concurrently in the same process in a form that is easily separated.
(d) The size of the initial polyolefin particles establishes the particle size of the final product. There are no large agglomerated particles and the production of undersized fine particles can be substantially eliminated.
(e) The process may be conducted in the process of inert diluents if desired.
(f) The process can be carried out in a single reaction vessel. The products of the invention have many advantages including:
(a) High proportions of polyolefin can be reacted into the graft polymer product.
(b) Useful blends of the graft polymer with other polymers can be made.
(c) The vinyl halide graft polymer of the invention can be blended with a polyvinyl chloride prepared by any desired process to give the desired final properties.
(d) A transparent or translucent vinyl halide polyolefin graft polymer is commercially feasible for the first time.

DESCRIPTION OF THE PREFERRED EMBODIMENTS

Monomer Component

In the broad aspect of the invention, the novel graft polymers of the invention is prepared from one or more ethylenically unsaturated compounds that is polymerizable in the presence of a free-radical initiator. Suitable ethylenically unsaturated compounds which can be used are illustrated by the following compounds. Monoolefinic hydrocarbons, i.e. monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear, alpha-alkyl or aryl substituted derivatives, e.g., o-, m- or p-methyl, ethyl, propyl or butyl styrene, alpha-methyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates, alkyl methacrylates, e.g., methyl, ethyl, propyl, butyl, octyl and lauryl methacrylate; alkyl crotonates, e.g., octyl; alkyl acrylates, e.g., methyl, ethyl, propyl, butyl, 2-ethylhexyl, stearyl, hydroxyethyl and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl compounds, e.g., allyl chloride, ally alcohol, allyl cyanide, allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, ethyl alpha-chloroacrylate, methyl alphabromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate and maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenonitrile, crotononitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl-2-chloroethyl ether, vinyl propyl ether, vinyl n-butyl ether, vinyl isobutyl ether, vinyl-2-ethylhexyl ether, vinyl 2-chloroethyl ether, vinyl cetyl ether and the like; and vinyl sulfides, e.g., vinyl beta-chloroethyl sulfide, vinyl beta-ethoxyethyl sulfide and the like can also be included as can diolefinically unsaturated hydrocarbons containing two olefinic groups in conjugated relation and the halogen derivatives thereof, e.g., butadiene-1,3; 2-methylbutadiene-1,3, 2,3-dimethylbutadiene-1,3; 2-methylbutadiene-1,3; 2,3-dimethylbutadiene-1,3; 2-chlorobutadiene-1,3; 2,3-dichloro-butadiene-1,3; and 2-bromo-butadiene-1,3 and the like. Mixtures of the foregoing compounds can also be employed.

Particularly useful monomer compositions include styrene, methyl methacrylate, methyl acrylate, vinyl acetate, mixtures of styrene and acrylonitrile, and mixtures of styrene and various maleates.

In one aspect of the invention, the preferred monomer composition is comprised totally of a vinyl halide monomer. Suitable vinyl halide monomers useful in the invention are the halo-substituted ethylenically unsaturated compounds which are capable of entering into an addition polymerization reaction, for example vinyl monohalides such as vinyl fluoride, vinyl chloride, vinyl bromide, and vinyl iodide, as well as vinyl dihalides such as vinylidene fluoride, vinylidene chloride, vinylidene bromide, and vinylidene iodide and the like. Higher halo-substituted compounds can also be used. Vinyl chloride is preferred.

While it is preferred that the monomer composition be comprised totally of vinyl halide monomer as described above, the present invention is also intended to include copolymers formed by the free-radical addition polymerization of a monomer composition containing a predominant amount, e.g., at least 50 percent of vinyl halide with the remainder being another ethylenically unsaturated monomer composition copolymerizable therewith. Preferably, the other ethylenically unsaturated monomer is used in amounts of 20 percent or less by weight and more preferably in amounts of 10 percent or less by weight of the total monomer used in preparing the polymer.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention includes all such combinations.

Polyolefin Component

The polyolefin component of the invention is characterized by being substantially insoluble in the reactive monomer component, and it remains insoluble during the polymerization reaction. The polyolefin is also capable of absorbing the reactive monomer component. For most polyolefin/monomer combinations, when the proportion of polyolefin in the reaction mixture is at least about 20 weight percent of the reactive components, essentially all of the monomer component is absorbed into the particles of polyolefin component where the reaction occurs.

Generally, the polyolefin is capable of absorbing monomer to the extent of at least about 10 weight percent of the weight of polyolefin, usually at least about 25 weight percent and more usually at least about 100 weight percent of the weight of polyolefin. Generally, the polyolefin can absorb monomer up to 10 times the weight of polyolefin, more usually up to about 400 weight percent and still more usually up to 300 weight percent of the weight of polyolefin. The polyolefin may swell in the presence of the monomer. But the polyolefin remains as a free flowing particles that does not agglomerate or fuse.

The preferred polyolefins are prepared from unsubstituted, aliphatic hydrocarbon monoolefins, including straight chain and branched chain compounds such as ethylene, propylene and butene-1, isobutene, pentene, hexene, heptene, octene, isobutene, 3-methylbutene-1, 4-methylpentene-1, 4-methylhexene-1, and 5-methylhexene-1.

The polyolefin also preferably contains an unsubstituted, aliphatic hydrocarbon polyene, such as diene or triene, as a monomer unit. Such unsubstituted compounds can be straight chain, branched chain or cyclic compounds. Generally polyenes of from 5 to 18 carbon atoms are employed.

Suitable comonomers for preparing the polyolefins are those utilized to prepare homopolymers as listed above such as propene or butene-1 with ethylene or isobutylene with isoprene and the like. Suitable termonomers are those utilized to prepare homopolymers and copolymers as disclosed above such as propene, ethylene and the like containing up to 15 percent, preferably up to about 10 percent by weight of polyene, for example, a diene such as dicyclopentadiene, 1,3-butadiene, 1,5-cyclooctadiene, 2-ethylidenenorbornene-5, 1,4hexadiene, 1,4-heptadiene, bicyclo(2.2.1)hepta-2,5-diene and other conjugated and especially noncojugated dienes with linear or cyclic chains.

Trienes such as isopropylidene cyclopentadiene and the Diels-Alder mono- and di-adducts thereof with cyclopentadiene can be used in place of the diene.

Unsubstituted, aliphatic diolefins can also be used for preparing useful polyolefins such as butadiene, isoprene, octadiene, and the like. Especially useful are the various forms of polybutadiene, such as made in emulsion, suspension or solution processes, and random, block, and star block polymers with monomers such as styrene.

Various other polyolefins that contain other than hydrogen and carbon can also be employed as long as they meet the criteria of being insoluble in the reactive monomer and capable of absorbing that monomer. Such polyolefins are generally polymers of unsubstituted, aliphatic hydrocarbon olefins of 2 to about 8 carbon atoms, and are more particularly polymers of an unsubstituted, aliphatic hydrocarbon olefin of 2 to about 8 carbon atoms and a substituted, aliphatic hydrocarbon olefin of 2 to about 8 carbon atoms. Suitable substituted hydrocarbon olefins include vinyl acetate, vinyl benzoate, and other vinyl esters with organic acids and haloacids, isopropenyl acetate and other esters, methyl methacrylate and other alkyl methacrylates, methyl acrylate, ethyl acrylate and other alkyl acrylates, and olefins. Included in such additional polyolefins are olefin-vinyl acetate copolymers, such as ethylene-vinyl acetate copolymers; olefin-acrylate copolymers, such as ethylene-acrylate copolymers; polychlorobutadiene, and the like.

Suitable polyolefin components include the above described homopolymers, copolymers or terpolymers, but can also include blends of two or more polyolefins that may not meet the criteria in themselves, but the blended composition is insoluble in the reactive monomer but capable of absorbing the reactive monomer. Thus, certain ethylene propylene diene modified polymers (EPDM) are soluble in vinyl chloride monomer, and hence are not suitable when used alone in the process of the invention. High density polyethylene (HDPE) is insoluble in vinyl chloride monomer, but does not absorb that monomer, and hence is not suitable when used alone in the process of the invention. However, it is found that mixtures of ethylene propylene diene modified polymers and high density polyethylene when melt blended are highly desirable in the process of the invention. The higher the ethylene content of the EPDM, the lower the amount of HDPE required. Particularly suitable are HDPE's having a melt index of 0.1 to 50, blended with a polyolefin, for example, EPDM at a ratio of from 1 to 20 to 20 to 1.

Low density polyethylene is found to be both insoluble in vinyl chloride monomer and capable of absorbing that monomer, and is useful in the process of the invention. The very low density polyethylene waxes, on the other hand, are soluble in vinyl chloride monomer and hence are not suitable when used alone in the process of the invention. Other useful blends of polyolefins include blends of polybutadiene and high density polyethylene. Very high molecular weight polymers, e.g. polybutadiene of weight average molecular weight of over 1,000,000, or ethylene propylene copolymer of weight average molecular weight over 300,000, function in this manner without blending in reactions where their lower homologs may need to be blended to meet the nonsolubility requirement. It is to be understood that a given blend or polymer may be substantially insoluble in certain monomers but is soluble or partially soluble in other monomers. Where partial solubility is involved, suitability of the polymer or blend and monomer combination for the purposes of the present invention depends on whether the graft polymer produced is in substantial particulate form.

The polyolefin used in the invention is in particulate form. the particles may be pellets, such as formed by extrusion through an orifice and cutting into pellets by a dicer. The particles can also be formed as pellets in a pellet forming device. The polyolefin is generally in the form of particles measuring in the range of about 1 to about 5 millimeters, preferably about 1 to about 3 millimeters. Other particle sizes can be used. The particles can be of various shapes, such as beads and cylinders, pill shaped, as well as in irregular shapes resulting from grinding.

Reaction Conditions

The products of the invention are preferably prepared in a mass polymerization process wherein solid discrete particles or pellets of solid polyolefin are mixed with a monomer component in the liquid state and a free-radical initiator compound at ambient temperatures. All or part of the mixture of monomer and initiator compound is absorbed into the solid polyolefin particles.

It is preferred to put all the monomer into the reactor with the polyolefin at the beginning of the reaction. However, the monomer can be added incrementally during the reaction. As indicated hereinbefore, the monomer can be reacted with the polyolefin in steps to achieve the desired product. Generally only sufficient monomer is introduced at one time to the polyolefin to avoid the formation of powdered polymer, except, of course, in the aspect of the invention where co-manufacture of particles of graft polymer and powdered homopolymer or copolymer is desired. When operating in the stepwise embodiment, the amount of monomer added in the second and subsequent steps does not usually exceed the ratio of monomer to polyolefin established in the first step of the sequence.

The reaction mixture is heated to a temperature in the range of about 30 to about 90 degrees Celsius, preferably in the range of about 40 to about 75 degrees Celsius, more preferably in the range of about 60 to about 70 degrees Celsius, and the reaction is allowed to proceed to the desired conversion of monomer, generally in the range of about 30 to 90 percent conversion, preferably about 50 to 80 percent conversion, and more preferably about 60 to 75 percent conversion. Thereafter, the unreacted monomer component is removed from the reaction mixture by suitable degassing techniques such as by direct degassing, by drawing a vacuum on the reaction product, by washing with water or a solvent or by steam distillation. The solid reaction product is withdrawn from the reaction vessel as the product of the process.

Initiators

Suitable initiator compounds for use in the process of the invention include organic or inorganic peroxides, persulfates, ozonides, hydroperoxides, peracids and percarbonates, azo compounds, diazonium salts, diazotates, peroxysulfonates, trialkyl borane-oxygen systems, and amine oxides. Suitable initiators are soluble in the organic phase, such as peroxides: benzoyl peroxide, capryl peroxide, lauroyl peroxide, 2,4-dichlorobenzoyl peroxide, diacetyl peroxide, and acetyl cyclohexylsulfonyl peroxide; azo compounds: azobisisobutyronitrile, azobis(alpha-methylgammacarboxybutyronitrile), azobis(alpha,gamma-dimethylvaleronitrile), 2,2'-azobis(2,4-dimethylvaleronitrile); peroxydicarbonates: diisopropyl peroxydicarbonate, di-sec-butyl peroxydicarbonate, and dicyclohexylperoxydicarbonate, azobisisobutyramidine hydrochloride, and peresters: t-butyl peroxypivalate and t-butyl peroxyneodecanoate. Peroxydicarbonates, peresters and peroxides are particularly useful in the present invention. The initiator is used in concentration ranging from about 0.01 to about one percent by weight, preferably about 0.1 to about 0.5 percent by weight, based on the total weight of the monomers. Amounts of initiator sufficient to initiate the reaction should be used. The best amount may vary depending on reaction temperature, nature of the polyolefin or allowed reaction time.

Diluents

Various diluents may be used in the process of the invention. Preferably, the diluents employed should be substantially non-reactive with the products of the invention and do not dissolve the products of the invention. The most common diluent is water, which may be used without any suspending or emulsifying agent. Essentially, when water is used as the diluent, the particles of solid polyolefin float in the water phase and during the reaction process are dispersed through the water phase by suitable agitation.

Other diluents include organic compounds such as saturated hydrocarbons having from about 3 to about 15 carbon atoms per molecule. Preferably, the diluent is a straight or branched chain, or cyclic saturated hydrocarbon having from 3 to 15 carbon atoms, and more preferably, from 4 to 8 carbon atoms. Alcohols of 1 to 15 carbon atoms can also be employed.

Illustrative examples of suitable diluents which can be employed in the present process include n-propane, n-butane, isobutane, isopentane, neopentane, 2-methylpentane, 3-methylpentane, 2,2,4-trimethylpentane, 2,2,3-trimethylpentane, n-tridecane and n-pentadecane. Mixtures of these and other hydrocarbon alkanes, as well as cycloalkanes, such as cyclohexane and methyl cyclopropane, can be used also. Useful alcohols include ethyl, isopropyl, butyl, isobutyl, octyl and dodecyl alcohols, ethylene glycol, propylene glycol, 1,3-dihydroxypropane, and the like.

The diluents can enter the polyolefin particle as in the case of hydrocarbons, or may stay out as in the case of water, or may do both.

When water is used as the diluent, the proportion may range from about 10 to about 1000 percent by weight based on the organic phase (polyolefin plus monomers), more preferably from about 100 to 400 percent by weight.

If an alcohol, hydrocarbon or other diluent is used, the proportion can be from about 0.1 to 100 percent by weight based on the polyolefin plus monomer, more preferably between 1 to 5 percent by weight.

Chain Transfer Agents

Chain transfer agents can be used in the process of the invention. One purpose of such chain transfer agents is to adjust the molecular weight of the polymerized monomer starting material. The polyolefin component itself is found to serve as a chain transfer agent by changing the molecular weight of the PVC produced in the case of vinyl chloride monomer. Other transfer agents that can be used include aldehydes, mercaptans such as mercaptoethanol, dodecylmercaptan; chloroolefins such as perchloroethylene, trichloroethylene, halomethanes such as bromoform, olefins, substituted isopropyl compounds, thiotin compounds, such as alkyltin mercaptoacetate esters and the like.

When a chain transfer agent is used, the proportion is generally in the range of about 0.1 to about 10 percent by weight, preferably from about 0.5 to about 2 percent by weight.

Stabilizers

The products of the invention are preferably stabilized against the adverse effects of heat, light and other environmental factors by introducing suitable stabilizers at the end of the polymerization reaction, but prior to the venting or degassing step to remove unreacted monomer, as well as, in subsequent compounding of the product with other additives. Surprisingly, the stabilizer can also be introduced at the beginning of the reaction. All or a combination of these stabilization techniques can by employed.

The polymer product of the invention has the advantage that it can absorb monomers, solvents and other liquid additives. This feature can be relied on to facilitate stabilization of the product. Prior to the degassing step to remove monomer, which step often discolors the product because of heat, a stabilizer can be added to the polymer particles. The stabilizer compound is absorbed into the particle to protect the polymer during degassing. In practice, the stabilizer can be mixed with monomer compound and then introduced to the reactor and mixed with the polyolefin particles. Another suitable liquid, such as an alcohol, can also be added with the monomer to facilitate absorption of the stabilizer into the monomer. Heating also helps to drive the stabilizer into the pellets. The stabilizer, monomer and other liquid, are absorbed into the polyolefin particles. Thereafter the monomer and other liquid are removed, such as, by heating, application of vacuum, steam distillation, and the like, leaving the stabilizer in the particles to protect the polymer.

Suitable stabilizers include salts of polyvalent metals such as cadmium, manganese, cerium, strontium, calcium, tin, barium, magnesium and lead and alkanoic monocarboxylic acids of 6 to 20 carbon atoms. Typical salts include the stearates, laurates, caproates, undecylates of the foregoing metals. Also used are amine stabilizers such as diphenyl amine, thiourea, aryl thiourea and the like. Also known as useful stabilizers are the alkyl esters of organotinmercaptide substituted alkanoic acids. The alkyl group in the ester part of the molecule may be methyl, n-butyl, ethyl, hexyl, isoctyl or other group. The organo groups on the tin atom may include methyl butyl or octyl, while examples of the base alkanoic acids are acetic or butyric. Esters of dibuty tin bis(iso-octyl mercaptoacetic acid) are particularly effective in this regard. Also useful in this connection are di-and tri-alkyl tin derivatives of $C_2$–$C_{18}$ alkanoic acids such as di-n-butyl tin diacetate and tri-n-octyl tin laurate. An especially good result is obtained using a mixture of the dioctyl tin stabilizers, namely a mixture of di-n-octyl tin mercaptide of mercapto acetic acid, isooctyl ester and tri-n-octyl tin laurate.

The dialkyltin maleates are useful stabilizers. They are more effective when dissolved or mixed with an alcohol, such as ethanol or other alcohol having up to 18 carbon atoms. The dialkytin maleates with alcohol can be advantageously added at the start of the reaction without adverse effects on the reaction and yet providing the desired stabilization effects on the polymer product.

Other suitable stabilizers include various phosphite esters. These can incude alkylphenyl phosphites such as nonylphenyl phosphite or 4,4-isopropylidene-diphenol, alkyl phosphite esters where the alkyl group contains 12-15 carbon atoms.

The stabilizers are employed in a proportion of about 0.01 to about 1 percent by weight, preferably about 0.05 to about 0.5 percent by weight, more preferably, about 0.1 to about 0.5 percent by weight, based on the weight of polymer. The most preferred range for the dialkyltin maleate with alcohol is about 0.05 to about 0.12 weight percent.

Color Removal Reaction

If the product is not stabilized or if a poor stabilizer is used and the product pellets come out highly colored due to decomposition during the high temperature degassing step where the PVC portion of the product decomposes into colored polyene units, it is possible to reverse this reaction in a post treatment using a small amount of monomer or monomer mixtures and free radical initiator that will react with the polyene units. An inert fluid medium may assist in transporting the monomer into the particles. Monomers listed under monomer components may be used where methyl methacrylate and styrene are particularly effective in this regard. Initiators listed hereinabove may be used. Any liquid that will dissolve the monomer and initiator and which will be absorbed by the solid product may be employed in this process. Hydrocarbons are particularly useful in this regard. The reaction proceeds effectively at 65° C. although with proper choice of components may be carried out between 30° and 90° C.

Product Components

In the polymerization reactions of the invention, a portion of the polyolefin is grafted with a portion of the unsaturated monomer to form a grafted polymer component. The product contains polyolefin and may contain some homopolymer or copolymer component resulting from polymerization of some of the unsaturated monomer or monomers. The proportions of the various components vary depending on reaction conditions. Chart A shows a typically range of proportions of the various components of the products of this invention.

organic or inorganic pigments, and the like. The products may be further reacted with other monomers to make a thermosetting product or may be crosslinked, vulcanized or further reacted in other ways.

A more detailed description of suitable stabilizers, lubricants and processing aids for incorporation into the compositions of the invention is presented in U.S. Pat. No. 4,319,002, the disclosure of which is incorporated herein by reference.

Additional classes of additives known for use in polyvinyl halide resins which can be added optionally to the compositions of the invention in addition to the aforementioned stabilizers, lubricants and processing aids include pigments, dyes and fillers as described in L. R. Brecker, *Plastics Engineering*, March 1976, "Additives 76", pages 3-4, the disclosure of which is incorporated herein by reference.

In general, the amount of each type of the aforementioned optional addtive employed in the present composition is about 0.01 to about 5 weight percent, preferably about 0.1 to about 3 weight percent, based on the total resin composition.

The graft polymers of the invention can be blended with polymers and copolymers, polymerized from the same unsaturated monomer or monomers used in preparing the graft polymers of the invention. Thus, graft polymers of a vinyl halide and a polyolefin can be blended with various preparations of a polyvinyl halide to provide a family of polymer products having utilities such as listed for the base graft polymer. An especially useful composition includes an EPOM-PVC graft polymer blended with PVC homopolymer which has been molded or extruded into useful objects having improved impact properties with good retention of these properties. Another useful composition includes the

CHART A
Components of Graft Polymer Products of Invention

| Proportion Weight Percent | Total Polymer | Graft Polymer | Ungrafted Polyolefin | Homopolymer or Copolymer of Unsaturated Monomer |
|---|---|---|---|---|
| General | 100 | 15-80 | 5-25 | 0-80 |
| Preferred | 100 | 20-60 | — | |
| Most Preferred | 100 | 30-50 | 2-10 | |

| | Proportion of Polyolefin | Grafted Polyolefin | Ungrafted Polyolefin | |
|---|---|---|---|---|
| General | 20-80 | 5-60 | 5-25 | |
| Preferred | 25-60 | 10-50 | — | |
| Most Preferred | 30-50 | 20-40 | 2-10 | |

| | Proportion of Monomer | Grafted Monomer | | Homopolymer or Copolymer of Unsaturated Monomer |
|---|---|---|---|---|
| General | 20-80 | 5-40 | | 0-80 |
| Preferred | 40-70 | — | | |
| Most Preferred | 50-60 | 10-30 | | |

Uses of Products

The polymers of this invention can be formed into useful articles such as bottles, sheeting, wire and cable coatings, films, membranes, pipe, fittings, appliance housings, roofing membranes, and the like where such properties as impact (room temperature or lower) heat distortion, tensile or flexural strength, fire retardance, clarity, oil resistance, long term retention of properties, etc. may be obtained depending on the exact nature of the monomer and polymer. The polymers can be compounded with or processed with such things as fillers (mineral, inorganic or organic) plasticizers, process aids, stabilizers, lubricants, coloring agents, such as above-described blend which additionally includes chlorinated PVC to give an impact polymer with improved heat distortion temperature. Other useful blends include those obtained by grafting to EPOM, polybutadiene (PBD), ethylene vinyl acetate copolymer or styrene butadiene block copolymers, such monomers or mixtures of monomers as vinyl chloride, styrene with acrylonitrile, methyl methacrylate, styrene, acrylonitrile, styrene with butyl maleate, styrene with maleic anhydride, cyclohexylacrylate, styrene with methyl methacrylate, methyl acrylate, methyl acrylate with styrene and lauryl methacrylate, and blending such graft polymers with the respective polymers or copolymers of the listed monomers or comonomers.

The graft polymer of the invention can be blended with various other polymers to provide products with different properties than the base graft polymer. Such other polymers include glassy, crystalline polymers, rubbery polymers and mixtures thereof as exemplified by ABS polymers. Examples of such polymers include polyvinyl chloride, styrene-acrylonitrile copolymers (SAN), polymethylmethacrylate (PMMA), chlorinated polyvinyl chloride (CPVC), graft copolymers of acrylonitrile and styrene on polybutadiene or a blend of acrylonitrile butadiene copolymer with styrene acrylonitrile copolymer (ABS), polyolefins, such as polyethylene and polypropylene, polystyrenes, poly α-methylstyrene, ABS-polycarbonate alloys, acetal polymers, cellulosic polymers, fluoropolymers, ionomers, nylons, polyphenylene oxide polymers, polysulfones, polyether sulfones, polyallomer, poly(ethylene vinyl acetate), poly(ethylene ethyl acrylate), polymethyl pentene, polyphenylene sulfide, thermoplastic elastomers, alkyl resins, epoxy resins, silicone polymers, urethane polymers, and the like, and any two or more of the foregoing polymers. Particularly useful blends include those obtained by grafting to EPDM, polybutadiene, ethylene vinyl acetate copolymer or styrene butadiene block copolymers, such monomers or mixtures of monomers as vinyl chloride, methyl methacrylate, cyclohexyl acrylate and styrene with methyl methacrylate, and blending such graft polymers with polymers such as polyvinyl chloride, styrene-acrylonitrile copolymers, polystyrene and acetal polymers.

Blends of the graft polymers of the invention with the just described other polymers and with the previously described polymers and copolymers polymerized with the same monomer or monomers used in preparing the graft polymers, are also contemplated. Typical of these blends include the graft polymer, polyvinyl chloride and a third polymer such as polystyrenes, styrene acrylonitrile copolymers, ethylene, propylene polyene modified polymers, polyethylene, chlorinated polyvinyl chloride, and a graft copolymer of styrene and acrylonitrile on polybutadiene or a blend of acrylonitrile butadiene copolymer and styrene acrylonitrile copolymers (both forms of ABS polymers), and the like. In some of the foregoing blends, the graft polymers of the invention are useful for compatibilizing otherwise non-compatible polymers such as polyvinyl chloride and polyethylene. The graft polymer can have end groups or parts similar to one or the other of the two materials.

Expecially useful blends of the products of the invention include (1) blends with polymers of acrylonitrile and styrene with polymers such as chlorinated polyethylene, acrylic rubber and ethylene propylene diene polymers, such as disclosed in copending application Ser. No. 541,399, filed on even date herewith, now U.S. Pat. No. 4,537,933; (2) blends with styrene maleic anhydride copolymers such as disclosed in copending application Ser. No. 541,398, filed on even date herewith, now U.S. Pat. No. 4,562,229; (3) blends with condensation polymers such as polycarbonates and polyesters, such as disclosed in copending application Ser. No. 541,195, filed on even date herewith, now U.S. Pat. No. 4,587,297.

Proportions of the polyolefin graft polymer in binary blends with any other polymer can range typically from less than about 1 percent to more than about 99 weight percent of graft polymer (with the balance being the other polymer component). It is preferred to provide blends which contain about 5 percent up to about 80 percent of the polyolefin graft polymer to achieve the desired enhanced properties. Preferred blends of this aspect of the invention contain about from about 10 percent to about 60 percent of the graft polymer component and from about 40 percent to about 90 percent of the other polymer component, said percentages being based on the weight of the blend of the graft polymer and the other polymer.

With respect to the aspect of the invention involving not only the graft polymer component and a second polymer component, but also an auxiliary polymer comprising a polymer or copolymer, the proportions of components are in the following ranges. The second polymer component is generally present in a proportion of about 20 percent to about 80 percent of the total polymer components, with the remainder being the polyolefin graft copolymer and the auxiliary polymer component. The latter two components are generally present in the proportion of about 10 parts polyolefin graft polymer to 90 parts auxilliary polymer to about 90 parts polyolefin graft polymer to 10 parts auxilliary polymer. The range is preferably from about 20 parts polyolefin graft polymer to 80 parts auxilliary polymer to 40 parts auxilliary polymer to about 30 parts polyolefin graft polymer to 60 parts auxilliary polymer. All parts and percentages are by weight.

THE EXAMPLES

The following examples are intended to illustrate but not limit the invention. Unless indicated otherwise in this specification and claims, parts, ratios and proportions are by weight, and temperatures are in degrees Celsius.

Example 1

Preparation of a Pelletized Polyolefin Graft Copolymer with Vinyl Chloride

Into a one liter glass autoclave equipped with a heating jacket and stirrer with helical elements, were charged 75 grams of a commercially pelletized blend of polyolefins containing approximately 85 weight percent of an EPOM elastomer having a molar ratio of ethylene to propylene of about 72 percent to 28 percent, and 3 double bonds of unsaturation as 1,4-hexadiene per 1,000 carbon to carbon bonds (db/1,000 C—C) of approximately 170,000 weight average molecular weight with about 15 weight percent high density polyethylene. The particle size of the pelletized blend was about 3 mm in diameter by 1.5 mm in thickness. The vessel was pressurized to 180 psig with nitrogen and the pressure was released. A solution of 0.5 ml of a 75% solution of the t-butyl peroxy neodecanoate in mineral spirits (free radical initiator) and about 305 grams vinyl chloride was added. About 5 grams of the vinyl chloride was vented from the reactor to purge volatile gasses to give a net charge of vinyl chloride of 300 grams. The mixture was heated with circulating water at 60° and was stirred at a rate of 100 rpm. Initially the mixture consisted of pellets floating on top of liquid monomer at 40 psig, and the total filled the reactor to the 500 ml mark. On heating and stirring, the liguid vinyl chloride phase gradually disappeared and the pellets became swollen. After 40 minutes of heating and stirring the liquid phase ceased to exist. The only liquid was that which refluxed from the unheated top of the reactor. The reactor now at 108 psig contained loose white swollen pellets to the 600 ml mark. The mass remained as swollen white pellets with traces of powder. The volume of the mixture gradually increased until a maximum of 800 ml was reached at 1.2 hour after start of heating. A maximum pressure of 165 psig was reached at 1.3 hour after start of heating. At this point, the temperature of the heating medium was dropped to 57° C. and held there for 20 minutes and then returned to 60° C. By this time (now 1.7 hour after start of heating), the pressure was 145 psig and the pellets were starting to "dry". There were traces of liquid still refluxing from the top of the reactor. After another 50 minutes, the pressure had fallen to 95 psig, the volume of loose stirring pellets decreased to 700 ml. and the reaction was terminated by venting unreacted monomer to a recovery system. The product contained 322 grams of material. Thirty grams of this was as agglomerated pellets in the lower corners of the reactor while the rest or 292 grams consisted of white free flowing pellets (91% of the total product) about 2–3 times the size of the starting pellet material. The polyolefin content of the final product was calculated by the following equation:

Equation 1

(75 grams polyolefin/322 total product) 100=23% total polyolefin.

The vinyl chloride conversion to polymer is given by equation

Equation 2

$$\left(\frac{322 \text{ grams product} - 75 \text{ grams polyolefin}}{300 \text{ g starting vinyl chloride}}\right) \times 100 = 80 \text{ percent}$$

The polyolefin-PVC product mixture was separated into its individual components taking advantage of the solvent-nonsolvent properties of the solvents listed in Table 1 for the individual components in the mixture.

EPDM part of the polyolefin. The insoluble fraction is a mixture of ungrafted high density polyethylene, with some polyolefin grafted with PVC. It is possible to estimate the amounts of the two from chlorine analysis, infrared spectrum analysis or in part by calculation. However, this generally has not been done. Thus, the amount of polyolefin in the grafted form was calculated in the form of a range depending on the amount of material in the hydrocarbon insoluble fraction given by the difference between Equations 3 and 4. This range is reported and used or a more specific number is used if additional data is available for a particular sample.

Equation 3

% grafted polyolefin maximum =

% total polyolefin (equation 1) −

% soluble in perchloroethylene and also in the hydrocarbon

Equation 4

% grafted polyolefin minimum =

% grafted polyolefin maximum −

% soluble in perchloroethylene and also in the hydrocarbon

The pellets after perchloroethylene treatment are freed of residual perchloroethylene and then extracted with dimethyl formamide (two times) by heating 1–2 hours at 100°, to give free ungrafted PVC as the soluble fraction (either discarded or may be precipitated by methanol or water if further studies are desired). The residual insoluble fraction is freed of solvent to yield polyolefin-PVC graft copolymer. For the product of Example 1 the assay numbers of interest are:

Total Polyolefin from Equation 1=23%
Range of grafted Polyolefin from Equation 3 and 4:
Equation 3: Maximum Grafted Polyolefin=23−5=18

TABLE 1

| | SOLVENT | | |
|---|---|---|---|
| Fraction | Perchloroethylene (100° C.) | Branched Hydrocarbon Mixture bp 100° (Shaken @ 65° C., Determined @ 25° C.) | Dimethyl Formamide (Shaken 65° cooled to 25° C.) |
| PVC Homopolymer | Trace Soluble | Insoluble | Soluble |
| EPDM in the initial Polyolefin Blend | Soluble | Soluble | Insoluble |
| HDPE in the initial Polyolefin Blend | Soluble | Insoluble | Insoluble |
| Polyolefin Graft Coplymer | Small Amount Soluble | Insoluble | Insoluble |

A method to approximately determine such compositions consists of heating about 5 grams (accurately weighed) of pellets with 200 ml perchloroethylene in a steam bath overnight, decanting the solvent from the swollen floating pellets with a large syringe, then repeating with another portion of perchloroethylene and heating another 3-4 hr. at 100° C. and again decanting. The combined perchloroethylene extract is freed of solvent on a rotary evaporator. This predominantly polyolefin fraction is extracted with dimethylformamide to remove traces of PVC homopolymer, freed of residual dimethylformamide, then extracted with a hot branched hydrocarbon mixture with cooling to room temperature before decanting. Concentration of this hydrocarbon extract gives predominantly the unreacted Equation 4: Minimum Grafted Polyolefin=18−4=14
∴ Grafted Polyolefin=14 to 18%

Percent of Polyolefin Grafted = $\left(\frac{14 \text{ to } 18}{23}\right)$ 100 = 61 to 78%

Polyolefin-PVc graft polymer32 37%

Examples 2-10

In like manner, several other reactions were carried out following the general procedure outlined above. Only the ratio of polyolefin to vinyl chloride to free radical initiator or other parameter was changed. These are listed in Table 2. Example 2 illustrates that at a high vinyl chloride to polyolefin ratio, powder was formed in addition to the pelletized product. Most of the polyolefin remained in the pellet and very little was found in the powder. In Example 3, the weight ratio of vinyl chloride to polyolefin was 6 to 1. Some powder was also formed. In Example 4, the vinyl chloride to polyolefin ratio is 4 to 1. At this ratio only pellets were formed with no powder. Examples 5-8 illustrate lower vinyl chloride to polyolefin ratios which give compositions with higher polyolefin contents.

In Example 9, too little free radical initiator was added to convert the vinyl chloride to a high degree. The polyolefin is not as highly grafted as in Examples 1-8. However, if the recovered product from Example 9 is reacted as shown in Example 10, it is possible to restart or continue the reaction and to make highly grafted product. It is possible to further react any other product to give lower level polyolefin containing products. Reference to Example 10 means a product prepared in two (or more) steps. Reference to other Examples in Table 2 means that the general conditions of Example 1 were followed using the ratio of reactants given by the particular example in Table 2.

cussed in Example 1, it was estimated that the product contained at least 21% polyolefin in the grafted form.

(B) In a still larger preparation, 2,000 lbs. of the polyolefin of Example 11(A), 6,700 lbs. vinyl chloride, and 4.7 liters of the initiator in Example 1, were charged to a reactor and heated initially at 60° followed by cooling the jacket to maintain a maximum internal pressure of 150 psig. The reaction was carried out for 2.5 hrs. followed by degassing, etc. The recovered product 6,300 lb. has a calculated polyolefin content of 31.5%. The isolated product was 99+% in the form of free flowing pellets. Only small amounts of powder (0.5%) and agglomerated pellets and scale (0.3%) were observed in the product.

Example 12

Aqueous Medium

In the reactor described in Example 1, equipped with a turbine type agitator, were charged 50 grams of the polyolefin of Example 1 and 400 ml water. The vessel was pressure tested and vented. Initiator (0.2 ml of 60 percent sec-butyl peroxydicarbonate in mineral spirits) and vinyl chloride (150 grams) were charged. The stirrer was operated at 500 rpm and the jacket was heated to 60° C. Initially the vinyl chloride floated on the water and the pellets floated on the vinyl chloride. The vinyl chloride was rapidly absorbed into the pellets and the swollen pellets floated on top of and were mixed into the moving water. The pellets quickly floated on top of the water if the stirrer was turned off. The pressure of

TABLE 2

REACTION OF VINYL CHLORIDE WITH THE POLYOLEFIN PELLETS OF EXAMPLE 1 AT 60° WITH t-BUTYLPEROXYNEODECANOATE INITIATOR, REACTOR STIRRED AT 15-20 RPM

| Example | Polyolefin (g) | Vinyl Chloride (g) | Initiator (ml) | Reaction Time Hours | Yield (g) | % Free Flowing Product | % Vinyl Chloride Conversion | % Total Polyolefin In Product | % Grafted Polyolefin In Product | % Graft Copolymer |
|---|---|---|---|---|---|---|---|---|---|---|
| 2 | 30 | 500 | 0.5 | 5 | 371 | 65 pellets<br>34 powder | 68 | (8) pellet<br>~0 powder | 7-9.5 | 14<br>2 |
| 3 | 50 | 300 | 0.5 | 4 | 275 | 84 pellets<br>10 powder | 69 | (18) | 16-17 | 41<br>2 |
| 4 | 75 | 300 | 0.5 | 4 | 235 | 97 | 54 | 32 | 15-23 | 27 |
| 5 | 100 | 300 | 0.5 | 4 | 275 | ~100 | 63 | 36 | 23-29 | 33 |
| 6 | 110 | 280 | 0.5 | 4 | 248 | ~100 | 47 | 44 | 26-34 | 41 |
| 7 | 125 | 330 | 0.5 | 4 | 276 | ~100 | 46 | 45 | 28-35 | 44 |
| 8 | 150 | 225 | 0.7 | 4 | 256 | ~100 | 47 | 59 | 25-47 | 46 |
| 9 | 125 | 250 | 0.3 | 4 | 157 | 96 | 13 | 80 | 10-23 | 29 |
| 10 | 150 of like product from Example 9 | 280 | 0.5 | 4 | 267 | ~100 | 42 | 48 | 28-37 | 65 |

*In Example 2, the initiator was lauroyl peroxide and the temperature was 70° C.

Example 11

(A) In a 5 gallon stainless steel reactor equipped with a helical uppumping agitator, was charged 4 pounds of the pelletized polyolefin described in Example 1. The vessel was pressurized with nitrogen to 180 psig and evacuated. Nine ml of the initiator of Example 1 and 12 pounds of vinyl chloride containing 5% isobutane were charged and the agitator was operated at 40 rpm and the jacket heated at 60° C. The pressure gradually increased to a maximum of 155 psig, and then fell. The reaction was allowed to proceed for 4 hours and then the unreacted monomer was recovered. Then 18 ml of a butyltin mercaptoacetate ester were added with 3 lbs. of VCM. The mixture was heated and stirred for 20 minutes. The unreacted monomer was recovered. The product was degassed under vacuum at 80° C. for 2.5 hours. The yield of white pellets was 11.5 pounds with a calculated polyolefin content of 35%. By the assay method disthe system increased to a maximum of 104 psig at 2 hours into the heating cycle. After 4 hours of heating, the pressure had fallen to 86 psig, and the unreacted monomer was recovered. The pellets were isolated from the water on a screen and dried to constant weight at room temperature. The yield was 129 grams of all free flowing pellets, containing 39% polyolefin and 53% vinyl chloride conversion. Assay as in Example 1 gave 28-32% grafted polyolefin and 48% graft polymer content.

Example 13

Other commercial polyolefins, available as pellet, crumb, or bale were blended with a commercial high density polyethylene by milling on a Farrell Mill (mill rolls at 350° F. for 3 minutes), followed by grinding with a Wiley Mill to pass 6 mm, and were evaluated as to suitability for this type of reaction. Vinyl chloride was the monomer in all cases, and the procedure and ratio of reactants of one of the above examples was employed as indicated in Table 3. The results of these examples are summarized in Table 3. Example 13A illustrates that when the polyolefin did not absorb monomer, then a graft polymer was not made. On the other hand, when the polyolefin is partially soluble in the monomer as in Examples 13F and 13H, mixtures tend to solidify or agglomerate into a single mass of material. On the other hand, the other polyolefins or polyolefin blends in Tsble 3 absorb monomer but remain insoluble so that useful compositions were prepared. Table 3 shows that many polyolefins can be converted to a form suitable to this type of reaction. Also it is noted that polymers other than high density polyethylene can be used to convert a polyolefin to a form suitable for reaction. Any other composition or mixture that meets the criteria of absorbing monomer but not dissolving in the monomer (or at least not dissolving during the time of reaction) will work and is considered to be within the spirit and intent of this disclosure.

Example 14

Any monomer-polymer combination that meets the criteria that the monomer will be absorbed into the polymer without dissolving the polymer can be used in the process of the invention. Thus, for instance, reactions of Table 4 illustrate the reaction of the polyolefin of Example 1 with other monomers.

TABLE 3

| | Example 13 | |
| | Reaction Condition | |
| Polyolefin Composition | For Evaluation | Result |
| --- | --- | --- |
| A. High density polyethylene (HDPE) pellets (control example) | Example 5 | Pellets did not absorb the monomer and initiator - no reaction in the pellet - recovered unreacted pellets and PVC homopolymer. |
| B. EPDM of Example 1 to HDPE ratio 15:85 | Example 6 | 63% free flowing polyolefin products, 10% powder and 27% agglomerated product, free flowing product at least 80% grafted |
| C. EPDM of Example 1 with HDPE ratio 1:2 | Example 6 | 88% free flowing polyolefin product at least 60% grafted. |
| D. EPDM of Example 1 with HDPE ratio 2:1 | Example 5 and 6 | Preparation of at least 40% grafted pelletized product. |
| E. Polyolefin of Example 1 - Ratio 85:15 (for comparative purposes) | Example 5 and 12 | Preparation of highly grafted pelletized product. |
| F. EDPM of Example 1 to HDPE 9:1 | Example 12 | Polyolefin mixture partially soluble in monomer resulting in polyolefin agglomerating into a solid mass. |
| G. Blend of 9 parts of a pelletized EPDM of approximate molar ratio 75% ethylene, 25% propylene and 4 db/1,000 C—C unsaturation as 1,4-hexadiene weight average MW 180,000 with 1 part HDPE | Example 12 | Preparation of at least 60% grafted free-flowing solid product. |
| H. The EPDM of Example 13G as a pellet without the HDPE | Example 1 | Agglomerated into a solid mass. |
| I. A 9:1 blend of a crumb EPDM of approximate molar ratio of 80% ethylene, 20 propylene and 5 db/1,000 C—C unsaturation as ethylidene norbornene of weight average molecular weight of about 220,000 with HDPE. | Example 12 | Preparation of a at least 70% grafted free flowing solid product. |
| | Example 6 | 95% free flowing product, some of it agglomerated into larger particles. |
| J. A 85%-15% blend of a bale EPDM of approximate molar ratio 65% ethylene, 35% propylene, 4 db/1,000 C—C unsaturation as ethylidene norbornene having weight average molecular weight of about 200,000 with HDPE. | Example 12 | Preparation of at least 80% grafted free-flowing solid product. |
| K. A pelletized EPR having about 80 mole % ethylene and 20% propylene with MW of about 400,000. | Example 5 | 85% free flowing product with 15% agglomerated material. Pelletized material was at least 70 percent grafted. |
| L. Polyolefin similar to that in 13K except ground through 5 mm. | Example 12 | 85% free flowing product. |
| M. Polyolefin of 13 L with 5% HDPE. | Example 12 | 96% free flowing product, 95% grafted. |
| O. A commercial pelletized ethylene-vinyl acetate copolymer having 9% vinyl acetate. | Example 12 | 96% free flowing highly grafted pelletized product. Starting pellets floating on water, product pellets sank. |
| | Example 5 | 75% pellets, 6% powder, 19% agglomerated pellets in the bottom of the reactor. |
| P. 80% of a bale EPDM with 65 molar ratio % ethylene, 35% propylene, 10 db/1,000 C—C unsaturation as ethylidene norbornene of about 180,000 weight average molecular weight with 20% HDPE. | Example 5 | 50% free flowing product, rest stuck on the wall of the reactor. Conversion of vinyl chloride was low. |
| Q. Commercial polypropylene | Example 6 | Pellets do not absorb monomer. Product is unreacted pellets plus powder. |
| R. EPDM of Example 1 with polypropylene ratio 85:15. | Example 12 | Polyolefin blend dissolved in the monomer. |
| S. A pelletized 45% vinyl acetate - 55% ethylene copolymer with HDPE 3:1 | Example 12 | 50% as agglomerated balls of various sizes, rest a coating on the reactor wall. |
| T. A bale EPDM of molar ratio 65% ethylene, 35% propylene, 5 db/1,000 C—C unsaturation as ethylidene norbornene of about 160,000 weight average molecular weight blended 4:1 with HDPE | Example 12 | Agglomerated with monomer. |
| U. The EPDM of T with HDPE 3:1 | Example 12 | Agglomerated with monomer. |
| V. The EPDM of Example 1 blended with high molecular weight polystyrene 85:15 | Example 12 | Good particle distribution, but low conversion. |
| W. The EPDM of A blended with a thermo- | Example 12 | Agglomerated with monomer. |

TABLE 3-continued

Example 13

| Polyolefin Composition | Reaction Condition For Evaluation | Result |
| --- | --- | --- |
| plastic elastomer containing tetramethylene terephthalate and tetramethylene ether components. | | |
| X. The EPDM of G with polymethylmethacrylate at a ratio of 9:1. | Example 12 | 95% free flowing particles. |
| Y. The EPDM of G with the product of Example 15A in the ratio of 9:1. | Example 12 | 87% free flowing product. |
| Z. The pellets as in Example 1 blend from whence the EPDM was extracted (ie porous | Example 4 | 92% pellets 8% powder |

TABLE 4

Example 14

Part 1
Reaction of 10 g polyolefin of Example 1 with Monomers and 0.1 ml of the initiator of Example 1 for 2 hours at 65° with shaking in a 4 oz. bottle.

| Reaction | Monomer | Amount | Appearance After Shaking | Yield (Grams) After Shaking With Isopropyl Alcohol | Product - Notes |
| --- | --- | --- | --- | --- | --- |
| A | Styrene | 5 ml | Free-flowing clear pellets | 9.9 | Similar to starting pellets |
| B | Methyl Methacrylate | 5 ml | Loosely agglomerated wet pellets | 9.8 | Has white spots |
| C | Styrene Methyl Methacrylate | 2.5 ml 2.5 ml | Loosely agglomerated | 10.1 | Like starting material |
| D | Butyl Maleate Styrene | 2.5 ml 2.5 ml | Free-flowing with liquid | 11.0 | Like starting material |
| E | Methyl Acrylate | 5 ml | Wet looking some agglomeration | 11.9 | |
| F | Maleic Anhydride Styrene | 2.5 g 2.5 ml | White free flowing | 14.6 | Opaque |
| G | Methyl Methacrylate | 10 ml | Clear-ball like | 17.5 | Nearly clear colorless pellets. Bigger than starting material |
| H. | Styrene | 10 ml | White-free flowing pellets | 16.5 | White pellets. Bigger than starting material. |

Part 2
Reaction of 10 g of the polyolefin of Example 1 with monomers and 0.25 ml of the initiator of Example 1 with shaking for 4 hours at 65° for an additional 16 hrs. in 4 oz. bottles.

| Reaction | Monomer | Amount Ml | Appearance After Reaction | Yield (Grams) After Extraction With Isopropyl Alcohol |
| --- | --- | --- | --- | --- |
| A | Styrene | 5 | free flowing pellets | 14.7 |
| B | Methylmethacrylate | 5 | free flowing pellets | 14.9 |
| C | Methylmethacrylate | 2.5 | free flowing pellets | 12.5 |
| D | Styrene | 2.5 | free flowing pellets | 12.2 |
| E | Styrene Methylmethacrylate | 2.5 2.5 | free flowing pellets | 14.5 |
| F | Styrene Methylmethacrylate | 1 1 | free flowing pellets | 12.1 |
| G | Styrene Acrylonitrile | 3.75 1.25 | free flowing pellets | 14.7 |
| H | Styrene Butyl Maleate | 2.5 2.5 | some sticking to the bottle | 13.9 |
| I | Cyclohexyl Acrylate | 2.5 | some sticking to the bottle | 12.1 |
| J | Methyl Acrylate | 2.5 | some sticking to the bottle | 12.5 |
| K | Methyl Acrylate Styrene | 2.5 2.5 | some sticking to the bottle | 14.8 |
| L | Lauryl Methacrylate | 2.5 | some sticking to the bottle | 12.1 |

In Example 14, the monomers were largely absorbed into the pellets without dissolving them. After the reactions, the products were shaken with isopropyl alcohol to wash out any residual monomer. The products in Reactions D to H of Table 4, Part 1 weigh more than the starting polyolefin indicating that polymerization has taken place. It is important to note that the polyolefin did not dissolve together or fuse solidly into a mass. In a second series, in Example 14 (Table 4-part 2) more initiator and longer reaction times were used to give products with almost all of the monomer converted to polymer. The pellets remained free flowing or in some cases some sticking was observed and the monomers polymerized in the pelletized polyolefin.

Example 15A

In another reaction of the same reactants as in Reaction B of Example 14 (Table 4, part 1) and in Reaction B of Example 14 (Table 4, part 2), using the same reactor as described in Example 1, where 100g of the polyolefin, 50 ml of methylmethacrylate and 1 ml of the t-butylperoxyneodecanate were heated with stirring for 6 hours, a yiled of 134 g of free-flowing clear pellet product was obtained indicating 85% conversion of the methyl methacrylate to polymer. An extraction of a sample at 65° by shaking with dimethyl formamide, a solvent for polymethylmethacrylate homopolymer dissolved 21% of the material indicated that 25% of the polymethyl methacrylate is actually grafted to the polyolefin in the pellets.

Exampel 15B

The product of Example 15A can be used directly or may be reacted in subsequent steps with other monomers to make different products. Thus, for instance, 50 g of the product of Example 15A along with 0.3 ml of the same initiator and 170 g of vinyl chloride were reacted in the same reactor at 60° for 4 hours. After recovery of unreacted vinyl chloride, a yield of 177 g of free flowing pelletized product was realized.

Example 15C

Stepwise reactions with two monomers can be carried out in the reverse order. Thus, a product was made according to Example 5 and then at the end of reaction and degassing 0.5 ml of the same initiator and 25 ml methyl methacrylate were charged and the mixture heated for 2 hours at 65° followed by final degassing to yield 312 g of pelletized product.

EXAMPLE 16

The principle of the reaction is not limited to the polyolefins illustrated above. A blend of 2 parts of a commercial solution prepared polybutadiene of weight average molecular weight of 225,000 was blended with 1 part of HDPE on a mill at 340°-350° F. and ground to pass a 5 mm screen. This material was reacted with other monomers according to Table 5.

EXAMPLES 17 to 21

The reaction of other polyolefins or other related materials is illustrated by Examples 17, 18, 19, 20 and 21. The starting polyolefin or other insoluble polymer capable of absorbing monomer were either of commercial nature or prepared according to Example 13. Reactions were generally carried out as in Example 16 where the solid, initiator and monomers were mixed in a 4 oz. bottle and shaken in a constant temperature bath at 65° for a time and the residual unreacted monomer was washed out of the polymer using isopropyl alcohol and the product dried to constant weight. In Example 17 a commercial pelletized ethylene vinyl acetate having 9% vinyl acetate was used to make products having essentially all of the starting monomer bound in the pellets which were free flowing.

In Example 18, a commercial pelletized star block copolymer having blocks of polybutadiene (70%) and polystyrene (30%) was reacted with a similar series of monomers. It is noted here that the monomers tend to stick the pellets together although the mixture did not solidify into a solid mass. The yield of polymer in Examples 18 A–D was in the low to medium range. However, if some isopropyl alcohol, an inert diluent, is added and the reaction time extended, the yield of product and the particle distribution are both improved.

In Example 19 several monomers were reacted with a solution prepared polybutadiene blended 3:1 with HDPE for 4 hours. The monomers were absorbed into the particles keeping the polyolefin a free flowing material but the conversion of monomer to polymer was slight. The recovered polyolefin blends from several of these examples were reused in the experiments in Exam-

TABLE 5

Example 16
Reaction of 10 g Polybutadiene-Polyethylene Blend with 0.1 ml of t-butyl Peroxyneodecanoate and Monomer with Shaking at 65° for 19 Hours

| Run | Monomer | ml | Product After Shaking | Soluble In Isopropyl Alcohol (g) | Soluble Acetone (g) | Yield After Extraction (g) |
|---|---|---|---|---|---|---|
| A | Styrene | 5 | Small ball, some stuck to wall, rest free-flowing | 0.1 | 0.3 | 13.6 |
| B | Styrene Methyl Methacrylate | 2.5 2.5 | Free-flowing | 0.1 | 0.6 | 14.8 |
| C | Styrene Acrylonitrile | 3.5 1.5 | Free-flowing | 0 | 0.2 | 14.4 |
| D | Methyl Methacrylate | 5 | Free-flowing, some stuck to wall | 0.1 | 0.9 | 13.8 |
| E | Styrene Acrylonitrile | 7.5 2.5 | Loosely agglomerated ball | 0 | 0.4 | 19.4 |
| F | Styrene | 10 | Some stuck to wall, rest free-flow | 0.1 | 0 | 18.7 |

For all combinations in Example 16, the monomers were almost totally converted to polymers judged by isopropyl alcohol extraction (shaken 1 hour, 65°, decant and dry) for monomers. After freeing the samples of residual isopropyl alcohol, they were extracted with acetone by shaking in a bottle in a bath at 65°. Acetone dissolves part or all of the homopolymers or copolymers involved here. Thus, the illustrated monomers are to a large degree grafted to the polyolefin. These materials themselves may be formed into useful articles or they may be used as impact modifiers for PVC, polystyrene, styrene-acrylonitrile, polymethylmethacrylate or many other polymeric materials to make useful products.

ple 20. Here the initiator level and the reaction time were both increased to yield several free flowing graft copolymer compositions. In examples with styrene and styrene maleic anhydride, reclaimed polyolefin blend now gave high yield polymer. The reactions with vinyl acetate and butyl vinyl ether still showed little conversion under these conditions. Copolymers with styrene-acrylonitrile and styrene-methyl methacrylate on new unreacted blend were also prepared in good yield.

In Example 21, a star block copolymer similar to that used in Example 18, but having a butadiene ratio to styrene ratio of 60:40 was used. This material was more prone to dissolving in the monomers used to the extent that blending with polyethylene and adding isopropyl alcohol only gave marginal results. The star block copolymer in E and F totally dissolved into the monomers. The reacions E and F in Example 21 would have little chance of success in the process at hand owing to too great a solubility while most of those other reactions in Examples 21 and 17 to 20 illustrate the point of the monomer going into the solid phase and polymerizing without dissolving the polyolefin or other solid material.

TABLE 6

Example 17
Reaction of an ethylene-vinyl acetate copolymer containing 9% vinyl acetate with some monomers and 0.15 ml di-sec-butyl peroxydicarbonate in 60% mineral spitits at 65° in a Shaker bath for 6 hrs.

| Reaction | Wt. EVA. | Monomer | ml | Appearance After Shaking | After Reaction, Weight Extracted by Isopropyl Alcohol | Yield of Polymer |
|---|---|---|---|---|---|---|
| A | 10.6 | Styrene | 5 | free-flowing pellets | 0.3 | 15.1 |
| B | 10.0 | Styrene | 2.5 | lightly stuck together | 0.3 | 14.7 |
|   |      | methyl methacrylate | 2.5 | into a ball which easily broke apart |   |   |
| C | 10.2 | methyl methacrylate | 5 | as in B | 0 | 15.0 |
| D | 10.2 | Styrene | 3.75 | as in B | 0.3 | 14.7 |
|   |      | Acrylonitrile | 1.25 |   |   |   |

TABLE 7

Example 18
Reaction of a commercial pelletized star block copolymer containing 70% polybutadiene and 30% styrene with monomers and 0.15 ml of di-sec-butyl peroxydicarbonate in 60% mineral spirits at 65° in a Shaker bath.

| Reaction | Wt. Star S—BR | Monomer | ml | Reaction Time hr. | Appearance After Reaction | Yield after Isopropyl Alcohol Extraction |
|---|---|---|---|---|---|---|
| A | 10.1 | Styrene | 5 | 6 | mostly stuck together to the walls but still pellets (not fused into a single mass) | 10.1 |
| B | 9.9 | Styrene | 2.5 | 6 | as in A | 11.5 |
|   |     | Methyl Methacrylate | 2.5 |   |   |   |
| C | 9.7 | Methyl Methacrylate | 5 | 6 | mostly as in A - some pellets free | 9.6 |
| D | 9.9 | Styrene | 3.75 | 6 | as in A | 13.3 |
|   |     | Acrylonitrile | 1.25 |   |   |   |
| E | 10.0 | Styrene | 2.5 | 6 shaken + 16 static | free flows lightly stuck together and to wall | 17.1 |
|   |     | Methyl Methacrylate | 2.5 |   |   |   |
|   |     | Isopropyl Alcohol | 5 |   |   |   |
| F | 10.4 | Styrene | 3.75 | 6 shaken 16 static | free flowing pellets | 14.7 |
|   |     | Acrylonitrile | 1.25 |   |   |   |
|   |     | Isopropyl Alcohol |   |   |   |   |

Table 8

Example 19
Reaction of a 3:1 polybutadiene-HDPE blend with monomers using 0.1 ml di-sec-butyl peroxydicarbonate with shaking at 65° for 4 hours.

| Reaction | Wt. Polyolefin Blend | Monomer | ml | Appearance After Reaction | Yield after Isopropyl Alcohol Extraction |
|---|---|---|---|---|---|
| A | 10.1 | Styrene | 5 | loosely agglomerated no liquid | 10.5 |
| B | 9.9 | Methyl Methacrylate | 5 | free flowing no liquid | 10.4 |
| C | 9.7 | Methyl Acrylate | 5 | free flowing | not determined no liquid |
| D | 10.3 | Vinyl Acetate | 5 | free flowing no liquid | 10.2 |
| E | 9.9 | Acrylonitrile | 5 | particulate like but all stuck to the wall | 12.7 |
| F | 9.9 | Vinyl Bromide | 5 | free flowing no liquid | 9.9 |
| G | 10.1 | Styrene | 2.5 | free flowing | 12.5 |
|   |      | Maleic Anhydride | 2.5 | brown spots, some maleic anhydride solid |   |
| H | 10.2 | Butyl Vinyl Ether | 5 | free flowing no liquid | 10.4 |

TABLE 9

Example 20
Reaction of a 3:1 polybutadiene-HDPE blend with monomers using 0.15 ml di-sec-butyl peroxydicarbonate 60% in mineral spirits in a bath at 65° with shaking for 6 hours and static for another 16 hours.

| Reaction | Wt. Polyolefin Blend | Source of Blend | Monomer | ml | Appearance After Reaction | Yield After Monomer Removal |
|---|---|---|---|---|---|---|
| A | 10.2 | New | Styrene | 3.75 | Free flow to loosely agglomerated | 14.6 |
|   |      |     | Acrylonitrile | 1.25 |   |   |

TABLE 9-continued

Example 20
Reaction of a 3:1 polybutadiene-HDPE blend with monomers using 0.15 ml di-sec-butyl peroxydicarbonate 60% in mineral spirits in a bath at 65° with shaking for 6 hours and static for another 16 hours.

| Reaction | Wt. Poly-olefin Blend | Source of Blend | Monomer | ml | Appearance After Reaction | Yield After Monomer Removal |
|---|---|---|---|---|---|---|
| B | 10.0 | New | Styrene<br>Methyl Methacrylate | 2.5<br>2.5 | Same as A | 14.8 |
| C | 11.9 | Recovered 19 - G | Styrene<br>Maleic Anhydride | 2.5<br>2.5 | Free flowing with some on the wall | 17.0 |
| D | 8.8 | Recovered 19 - A | Styrene | 5 | Free flowing | 13.4 |
| E | 8.6 | Recovered 19 - B | Methyl Methacrylate | 5 | Free flowing at start - Sample lost | — |
| F | 9.6 | Recovered 19 - D | Vinyl Acetate | 5 | Free flowing | 10.1 |
| G | 10.0 | Recovered 19 - H | Butyl Vinyl Ether | 5 | Free flowing to slightly agglomerated | 10.2 |

TABLE 10

Example 21
Reaction of a commercial pelletized star block copolymer containing 60% polybutadiene and 40% polystyrene also blends of the same polymer blend with high density polyethylene at 3:1 using 0.1 ml di-sec-butyl peroxydicarbonate, 60% mineral spirits and 5 ml isopropyl alcohol at 65° with shaking.

| Reaction | Polyolefin Nature | Wt. | Monomer | ml | Appearance After 2.5 hr. Reaction | Yield After Extracting Unreacted Monomer |
|---|---|---|---|---|---|---|
| A | HDPE Blend | 10.5 | Styrene | 5 | loose ball | 11.6 |
| B | HDPE Blend | 9.7 | Styrene<br>Methyl Methacrylate | 2.5<br>2.5 | loose ball | 11.7 |
| C | HDPE Blend | 9.9 | Methyl Methacrylate | 5 | some free flow, some agglomerated | 14.5 |
| D | HDPE Blend | 9.9 | Styrene<br>Acrylonitrile | 3.75<br>1.25 | loosely on the wall | 12.3 |
| E | Star Polymer | 9.9 | Styrene | 5 | dissolved | 11.0 |
| F | Star Polymer | 10.4 | Methyl Methacrylate | 5 | dissolved | 12.7 |

EXAMPLE 22

Some reagents were screened as to their suitability in stabilizing typical compositions by shaking 10 grams of pellets made in accordance with the reactants and procedure of Example 10, but having 30% total polyolefin with 2.5 ml hexane as the carrier media and a stabilizer in a bottle in a bath at 65° for one hour, evaporating the carrier and then heating in an oven for a period of time and comparing the color of the resulting materials. Results are given in Table 11. Of those listed, the butyltin mercaptoacetate ester, the nonylphenyl phosphite and the alkyltin maleate are most effective in keeping the color of the pellets to a minimum. The latter material, a solid, seems to be surprisingly more effective when used with ethanol as a solvent than it is when either alone or with other solvents.

EXAMPLE 23

(A) In a reaction process of the invention, the stabilizer is flushed into the reactor with vinyl chloride monomer after the end of the reaction time. The reactor may be cooled or some vinyl chloride monomer can be vented from the reactor to recovery to facilitate this addition. The vinyl chloride can be heated or pumped to drive it into the reactor. The mixture is then heated and stirred for a short time, e.g. 15 minutes, to drive the stabilizer into the particles and then the monomer is recovered normally. Examples in Table 12 prepared using the polyolefin of Example 1 and employing synthesis procedures of Examples 5–8 illustrate this stabilization procedure. After the main bulk of the monomer was recovered, the pellets were heated under vacuum to bring the residual volatiles levels, as determined by allowing the final product, to stand in a hood with a good draft 20 hours, to low or indicated levels.

TABLE 11

Example 22

| | Stabilizer | Amount | Result after Heating At 100° 2-4 Hours | 20 Hours |
|---|---|---|---|---|
| A | None - Control | | Light Purple | Purple |
| B | Butyltin Mercaptoacetate Ester | 0.05 ml | White | White to Light Pink |
| C | Nonylphenyl Phosphite | 0.25 ml | White | Light Brown |
| D | Dibutyl Maleate | 0.5 ml | Light Purple | Same |
| E | Epoxyidized Soya | 0.1 ml | Light Purple | Purple |
| F | 20% Solution of an Alkyl Tin Maleate in Ethanol | 0.1 ml | White | White to Light Pink |
| G | 20% Solution of Alkyl Tin Maleate in Toluene | 0.25 | Pink | Light Purple |
| H | 20% Solution of an Alkyl Tin Maleate in Perchloroethylene | 0.25 | Light Pink | Light Purple |
| I | 20% Solution, 2,6-dibutyl p-cresol in ethanol | 0.4 ml | Light Purple | Purple |

TABLE 12

Example 23

| Run | Stabilizer | phr on Pellets | Heating Under Vacuum Time Hr. | Heating Under Vacuum Temp. °C. | Color | Volatiles (Percent) |
|---|---|---|---|---|---|---|
| A | None - Control | | 2 | 80 | Purple | 0.16 |
| B | Dibutyltin Mercaptoacetate Ester | 0.1 | 2.5 | 90 | Light Pink-Purple | 0 |
| C | Dibutyltin Mercaptoacetate Ester | 0.4 | 2.5 | 90 | White | 0.45 |
| D | Nonylphenyl Phosphite | 0.4 | 2.5 | 80 | White | 0.13 |
| E | Nonylphenyl Phosphite | 0.2 | 2.5 | 95 | Light Pink | 0.1 |
| F | Commercial Alkyltin Maleate 20% in Ethanol | 0.1 (0.5 of solution) | 3 | 90 | Off White | 0 |
| G | Commercial Alkyltin Maleate and Ethanol added at start of reaction | 0.1 0.3 | 3 | 95 | Off White | 0 |

Example 23 illustrates how the three materials allowed the resin to be heated hotter and longer than the control while still keeping the color of the pellets light or white. Additionally in Example 23G, the combination of alkyltin maleate in ethanol was added at the start of the reaction with no effect on the reaction. This allowed the end of reaction addition step to be avoided and still giving good color retention during the degassing.

(B) The color in products such as Example 23A can be reacted out. Thus, 10 g of product like 23A was treated with 1 ml methylmethacrylate and 0.05 ml 60% di-sec-butyl peroxydicarbonate in mineral spirits with shaking at 65° for 1 hr. At the end of this time most of the pellets were colorless although there were traces of color at the center of some pellets which gradually faded as the reactants slowly reached the center. Similar results were obtained using 0.5 ml styrene in place of the methylmethacrylate. If only 0.05 ml methylmethacrylate were used with 0.005 ml initiator, very little reaction took place. However, the same charge including 1 ml of a hydrocarbon solvent was as effective as the first mentioned reaction in removing the color.

EXAMPLE 24

Transparent Graft Polymer

Reactions were carried out in accordance with Example 2. Pellets as described in Example 1, initiator, and monomer were added to a reactor and heated with stirring at 60° C. to make product. In Example 24C, product from one reactor was added back to the reactor with more monomer and initiator and the process repeated. In Example 24B, after initial reaction the reactor was cooled to charge more initiator and monomer and then heated to continue the reaction. Examples in Table 13 illustrate the synthetic scheme.

TABLE 13

Example 24

| Ex. No. | Polyolefin (grams) | VCM (grams) | Init. ml | Reaction Time (hours) | Yield (grams) | % Pellet | VCM Conv. % | Percent Total Polyolefin | Percent Graft Polyolefin |
|---|---|---|---|---|---|---|---|---|---|
| A | 30 | 500 | 0.5 | 5 | 371 | 65 34 Powder | 68 | 8.1 | 14 |
| B | 75 at 2.5 hr. | 280 180 | 0.5 0.5 | 2.5 +2 | 403 | 97 | 71 | 18.5 | 51 |
| C-1 | 1800 | 3650 | 6 | 5 | 3850 | 100 | 56 | 47 | 44 |
| C-2 | 200 of C-1 product | 660 | 1 | 4 | 570 | 89 11 Powder | 56 | 18 | 32 |
| C-3 | 150 of C-2 product | 280 | 0.5 | 3 | 351 | 88 7 Powder | 70 | 9 | 38 |

In the control Example 24A, a product with 8.1% total polyolefin was made of which 65% was pellets and 34% powder. In Example 24B a product with 18% total polyolefin was prepared and only 3% was powder. One more monomer addition step would be required to bring this into the same range as the control.

In Example 24C, a product having 9% total polyolefin was prepared with minimal powder in two of the three steps and none in the other. A 115 gram sample of the pellets was worked on a mill at 350° F. with 2 grams of dibutyltin mercaptoacetate ester stabilizer and 2 grams of acrylate process aid for 5 minutes, sheeted out and compression molded at 350° F. and 1000 psi into a 6×6" plaque ⅛" thick. This plaque when placed on a printed page had sufficient clarity to read the printing through it vs a plaque from the control which was too opaque to read through. The sample was cut into samples for testing. These had 13.1 ft.-lb./in. impact in the notched Izod test vs. 19.8 ft.-lb./in. for the control. Both failed in a ductile fashion with crease whitening.

EXAMPLE 25

Co-Manufacture of PVC and Graft Polymer by Mass Polymerization

A 2½ gallon reactor equipped with a turbine type agitator was charged with 0.7 ml of a 75% solution of sec-butyl peroxydicarbonate and 16 lb. vinyl chloride. The agitator was operated at 1200 rpm during the reaction time which consisted of 18 minutes heating to 170 psig and 35 minutes at this pressure to a low degree of conversion of vinyl chloride. The resulting mass was transferred to a 5 gallon reactor equipped with a helical stirrer set for 60 rpm and containing 90 grams of the polyolefin of Example 1, 1.8 ml of a 75% solution of sec-butyl peroxy dicarbonate, 5.0 g of decanoyl peroxide and 4 lb. vinyl chloride. The resulting mass was heated until the pressure in the vessel reached 170 psig and the jacket was maintained to hold this pressure for 3.75 hr. At the end of this time the unreacted monomer was recovered and the reactor emptied. The product was screened yielding 13.4 lb. through 40 mesh (75%) powdery resin, 1 lb. (6%) of larger particle size powder that passed a 10 mesh screen but not 40 mesh, 2.1 lb. (12%) of an on 10 mesh fraction of which 1.9 lb. were in the form of pellets and 0.2 lb. agglomerated powder and scaley material, and finally 0.8 lb. (15%) of reactor scrapings, etc. The powdery fraction was essentially free of polyolefin as judged by the fact that a film pressed from it at 180° C. was clear. Also shaing a 10 g sample with 200 ml dimethylformamide (a solvent for PVC but not polyolefin) was clear indicating that the PVC powder contains little or no polyolefin. Assuming that all of the polyolefin has remained in the pellets, then the pelletized product must contain $(90 \div 870) \times 100 = 10.4\%$ polyolefin and 89.6% PVC. Using the method of Example 1 the pelletized product was found to contain 17% graft copolymer with 8.4-9.4% grafted polyolefin in the product. When this pelletized material was converted to a plaque according to Example 24C, the product was found to have a notched Izod impact of 19.8 ft.-lb./in.

EXAMPLE 26

Co-Manufacture of PVC and Graft Polymer by Aqueous Process

Graft polymer and PVC are co-manufactured in aqueous medium by first introducing water and suspending agent into a reactor, followed by the polyolefin of Example 1, the initiator of Example 25, and vinyl chloride. The mixture is agitated and the reaction temperature is raised to 70° C. for ten hours. The resulting product comprises 15 percent of pellets of graft polyolefin and the remainder PVC powder.

EXAMPLE 27

The vinyl halide graft polymers of the invention can be used to modify the properties of polyvinyl halide. To illustrate, the product of Example 11A was blended with an injection molding grade PVC homopolymer along with 2 parts dibutyltin mercaptoacetate ester stabilizer and 2 parts acrylate process aid. The blend was compounded on a Farrell two roll mill at 350° F. and then compression molded into 6×6×⅛" sheet using a Carver press at 350° at 900 psig followed by cooling under pressure.

Samples were cut from the sample for testing by the notched Izod method (ASTM D256). The results are illustrated in Table 14.

TABLE 14

| | Example 27 | | | | |
|---|---|---|---|---|---|
| Sample | Parts Polyolefin Grafted by PVC | Parts PVC | Polyolefin Content of Molded Sample | Estimated Grafted Polyolefin | Notch Izod ft-lb./in. |
| A | 16 | 84 | 5.5 | 3.5 | 3.2 ± 1 |
| B | 19 | 81 | 6.7 | 4.2 | 13.9 ± 2.5 |
| C | 23 | 77 | 8.2 | 5.2 | 18.1 ± 1.6 |

Sample 27A in which PVC was mixed with the grafted polyolefin at the ratio of 5.25 to 1 had brittle failures and low values in the Izod test. However when the PVC was mixed with the grafted polyolefin at the ratio of only 4.3 parts for each part of the grafted polyolefin the impact was 13.9 ft.-lb./in. with all ductile type failures. At still lower PVC to grafted polyolefin, higher impact values can be achieved.

Other materials have been blended and examined in a similar fashion. As a control, if the starting polyolefin of Example 1, 15 parts, is blended with 100 parts PVC and processed as above, the notched Izod impact of the blend is 1.4 ft.-lb./in. A blend of the product from the low conversion reaction product in Example 9 (15 parts with 100 parts PVC) or calculated 10.5% total polyolefin had an Izod of 1.9 ft.-lb./inch. When this product was reacted further as in Example 10, and the product blended with PVC homopolymer to have only 7.9% polyolefin it had 17.3 ft.-lb./in. impact.

The product of Example 12 when blended with PVC homopolymer to have 7.8% polyolefin in the final product, the molded material had 14.4 ft.-lb./in. of notched Izod impact.

The product of Example 13, Table 3Z, when blended with PVC to have 8% total polyolefin (35% pellet composition, 65% PVC) and treated as above had 13.3 ft-lb/in impact.

Other molded materials prepared by blending the products of Examples 2-8 to have 7-8% polyolefin also had high notched Izod impact strengths with ductile type failures.

EXAMPLE 28

Similar results are obtained when the product of Example 11A is blended with PVC and mixed with the same additives as in Example 27, and then injection molded into test bars using an Arburg 200 injection molding machine with zone settings at 320°-340° F. and the mold at 100° F. The mix conditions include: (1) milling as above followed by grinding, (2) milling the grafted polyolefin with part of the PVC, grinding, followed by mixing in the rest of the PVC in a Brabender plastograph with Haake ¾" extruder attachment with screw L/D at 24 to 1 with zones set at 170°-180° C., (3) blending the pellets, additives and homopolymer in a Henschel high speed mixer followed by passing through the extruder in 2 and (4) as in 3 except that the material was passed 2 times. The results of the impact testing on the material compounded in different ways is given in Table 15.

TABLE 15

Example 28

| Sample | Parts Grafted Polyolefin | Parts PVC | Mixing Method | Polyolefin Content Of Sample | Estimated Grafted Polyolefin | Impact Notch Izod ft-lb/in | Notes |
| --- | --- | --- | --- | --- | --- | --- | --- |
| A | 30 | 70 | 1 | 10.6 | 6.3 | 20.1 | Aged 70° 1 week 15.3 ft.-lb./in. Weathered 500 hr. in a Weatherometer 18.5 ft.-lb./in. |
| B | 25 | 75 | 1 | 8.8 | 5.3 | 19.7 | |
| C | 25 | 75 | 2 | 8.8 | 5.3 | 16.0 | 50:50 mix, then 1:2 dilute |
| D | 25 | 75 | 2 | 8.8 | 5.3 | 19.8 | 75:25 mix, then 1:3 dilute |
| F | 25 | 75 | 4 | 8.8 | 5.3 | 22.3 | |
| G | 20 | 80 | 1 | 7.0 | 4.2 | 3.7 | |

The data in Table 14 show that high impact values are obtained at above about 5% grafted polyolefin. Also the 6.3% grafted polyolefin sample showed good retention of impact on heat aging and on accelerated weathering.

EXAMPLE 29

A blend of 30 parts of a grafted polyolefin prepared according to Example 10 but having 30% polyolefin with 70 parts of an injection molding grade of chlorinated PVC was milled with stabilizer and process aid as above, compression molded and tested as in the PVC examples above. The Izod impact and heat distortion temperature (at 264 psi) was determined for this material and for a similar PVC blend. These are noted in Table 16.

TABLE 16

| | Heat Distortion °C. Temperature | Notched Izod Impact ft.-lb./in. |
| --- | --- | --- |
| Grafted Polyolefin-Chlorinated PVC | 76 | 15.3 |
| Grafted Polyolefin-PVC | 72 | 18.6 |

The plastic made with the chlorinated PVC has a higher heat distortion, with still good impact and ductile type failure, than does the material made with the PVC homopolymer. Other blends with other grades of chlorinated PVC can have higher heat distortion temperatures.

EXAMPLE 30

It is possible to blend any of the compositions prepared according to Examples 1-21 above with polymers such as PVC or chlorinated PVC as just disclosed in Examples 24-26 or with other polymers or copolymers to achieve desired results such as impact resistance, clarity, fire retardance, compatibilization of noncompatible polymers or other special properties. Table 17 illustrates the blending of several of the compositions prepared in Examples 1-21 with homopolymer, copolymers, and mixtures of polymers. These were mixed using a 5 g sample of material on a small lab two roll mill heated to 380°-390° F. The products were mixed for 2-5 minutes depending on the ease of mixing the components. The milled sample was then pressed out on a Carver press at 180° C. and about 100 psi pressure, into a specimen which after cooling was bent, cut and torn to evaluate possible physical properties. Particularly desireable blends are those that have good clarity, that bend with difficulty and/or when bending hinge rather than break or crease whiten when they do break, and/or are cut without cracking and/or when torn at the end of the cut show resistance, break in an irregular manner, whiten, etc., rather than snapping. In Table 17, composition A shows that an unmodified commercial styrene-acrylonitrile copolymer processed well to give a clear sample which shattered when it was bent, cracked when it was cut, and snapped when it was torn at the end of the cut. In blend B, PVC blended with the polybutadiene polyethylene reacted with styrene and methylmethacrylate at 4:1 gave a clear film that bends with crease whitening and without breaking, is cut without cracking, and which breaks in two different ways when the cut is torn. The 3:2 blend did not mix well at the mill temperature. The mixture (Z) of PVC with a butadiene-styrene block polymer reacted with styrene and methylmethacrylate has similar properties. Other examples suggest impact modifiers for polystyrene (E, Y), polymethyl, methacrylate (H, I, N) styrene-acrylonitrile copolymer (G, M, S), PVC (W, X) and acetal resin (Q). The composition of Example 15C where a pellet polyolefin was reacted first with vinyl chloride and then methylmethacrylate and then is blended with PVC and poly(methyl methacrylate) (V) is essentially clear with good toughness. Examples AA, AB, and AC illustrate how a grafted polyolefin can be used to make a more compatable blend between high density polyethylene and PVC. The two polymers by themselves mix very poorly (AA). Twenty percent of a grafted polyolefin composition improved the mixing (AB) but 30% of a grafted polyolefin (prepared from a 2:1 blend ethylene-propylene diene with HDPE and reacted with vinyl chloride to contain 50% polyolefin and 50% PVC) was much more effective (AC) in giving a tough PVC-HDPE blend.

The blending to make two noncompatible components more compatible as illustrated by AA to AC in Table 17 can also be extended to scrap reclaiming. Polyethylene scrap frequently contains 5-10 parts of PVC or polystyrene which adversely effects the properties of the reprocessed scrap. If on the other hand 10-15 parts of a grafted polyolefin (by vinyl chloride, styrene or other monomer depending on the scrap impurity) composition of the invention is added, the minor plastic becomes more compatable with the polyethylene and maintains the properties of the recovered material.

In a similar way, high strength PVC and EPDM blends, and fire retardant EPDM materials can be prepared by blending PVC with EPDM in the presence of 10-30 parts of composition 11B or other example.

TABLE 17

Example 30

Small Scale Blends of Pelletized Compositions with other Polymers mixed on a Small Laboratory 2-Roll Mill at 380–390° F. and then Pressed into a Film at 180° C. in a Carver Press.

| Source of Polymer Components | Polymer Components | Ratio | Processing Notes | Film Appearance | Result on Bending Film | Result on Cutting Film | Result on Tear at end of Cut |
|---|---|---|---|---|---|---|---|
| A. Styrene-acrylo-nitrile (SAN) copolymer | Styrene-acrylonitrile copolymer (SAN) | reference control | good milling good film | transparent | shattered | cracks | snaps |
| B. Example 20, Table 9 #B | PBD—PE-reacted with styrene and methyl methacrylate PVC | 1 | good mixing | ca clear | bends with crease whitening | cuts | some whitening some brittle breaking |
| C. Example 20, Table 9 #B PVC | PBD—PE-reacted with styrene and methyl methacrylate PVC | 4 2 | would not band on mill | film not continous lumps | | | |
| D. Example 14, Table 4, Part 1 #H | Polyolefin of Example 1 reacted with Styrene | 3 1 | good mixing | white opaque | snaps | cuts-white | tears with whitening |
| E. Example 14, Table 4, Part 1 #H | Polyolefin of Example 1 reacted with Styrene | 4 2 | good mixing | white opaque | hinges-breaks with 1-2 flexes | smooth cut | tough-some strength in the rip |
| F. Example 20, Table 9 #A | PBD—PE-reacted with Styrene & Acrylonitrile | 3 1 | good mixing | translucent | snaps | cracks | snaps |
| G. Example 20, Table 9 San | PBD—PE-reacted with styrene & acrylonitrile SAN | 4 2 | not completely mixed | opaque with clear spots | snaps but held together by the clear spots | cracks | irregular break |
| H. Example 15A | Polyolefin of Example 1 reacted methyl methacrylate polymethyl methacrylate (PMMA) | 3 1 | good mixing | translucent | broke with whitening | cuts | tears with whitening |
| I. Example 15A | Polyolefin of Example 1 reacted methyl methacrylate PMMA | 4 2 | good mixing | film sticks opaque | breaks-whitens little strength | | little tear resistance |
| J. Example 13, Table 3 #0 SAN | EVA pellet reacted with vinyl chloride SAN | 3 1 | not complete mixing | white with red spots | snaps | white edges on cut | cracks |
| K. Example 13, Table 3 #0 SAN | EVA pellet reacted with vinyl chloride SAN | 4 2 | good mixing | opaque pink | snaps | cut-tough | tear irregular |
| L. Example 11 #B SAN | Polyolefin of Example 1 reacted with vinyl chloride as in Example 11B | 3 1 | good mixing | pink opaque | snaps | white edge on cut | |
| M. Example 11 #B SAN | Polyolefin of Example 1 reacted with vinyl chloride as in Example 11B | 4 2 | good mixing | opaque pink | hinges-crease whitens | cuts | very tough rips |
| N. Example 11 #B PMMA | Polyolefin of Example 1 reacted with vinyl chloride as in Example 11B PMMA | 3 1 | good mixing | clear film | hard to bend crease whitens and either bends or breaks | cracks | some tear strength |
| O. Example 11 #B | Polyolefin of Example 1 reacted with vinyl chloride | 4 2 | did not completely fuse | | | | |

4,661,549

TABLE 17-continued
Example 30
Small Scale Blends of Pelletized Compositions with other Polymers mixed on a Small Laboratory 2-Roll Mill at 380–390° F. and then Pressed into a Film at 180° C. in a Carver Press.

| Source of Polymer Components | Polymer Components | Ratio | Processing Notes | Film Appearance | Result on Bending Film | Result on Cutting Film | Result on Tear at end of Cut |
|---|---|---|---|---|---|---|---|
| PMMA | as in Example 11B | | | | | | |
| P. Example 14, Table 4, Part 2 #B | PMMA Polyolefin of Example 1 reacted methyl methacrylate | 3 1 | mixed OK | opaque | broke if fast bend if slow not broken crease whitened | | |
| Acetal resin Q. Example 14, Table 4, Part 2 #B | Acetal resin Polyolefin of Example 1 reacted methyl methacrylate | 4 2 | good mixing | opaque light yellow | crease whitened little or no break | clean cut | irregular break |
| Acetal resin R. Example 14, Table 4, Part 2 #G | Acetal resin Polyolefin of Example 1 reacted with styrene and acrylonitrile | 3 1 | good mixing | white | snapped | smooth cut-white edges | irregular break |
| SAN S. Example 14, Table 4, Part 2 #G | SAN Polyolefin of Example 1 reacted with styrene and acrylonitrile | 4 2 | good mixing | white opaque some dark spots | good strength partial break only | cut smooth | irregular tear |
| SAN T. Example 14, Table 4, Part 2 #E | SAN Polyolefin of Example 1 reacted with styrene and Methyl methacrylate | 3 1 | good mixing | white | snaps | white edges | irregular break whitening |
| Polystyrene U. Example 14 Table 4, Part 2 #E | polystyrene (PS) Polyolefin of Example 1 reacted styrene-methyl methacrylate | 4 2 | good mixing | white opaque | crease whitens partial break | clean cut | tough to tear |
| PS V. Example 15C | PS Polyolefin of Example 1 reacted vinyl chloride then methyl methacrylate PVC PMMA stabilizer | 3 1 2 2 0.1 | good mixing | hazy clear | hinges with crease | clean cut | tough to tear, rips with mostly whitening and occasional brittle fails |
| W. Example 14, Table 4, Part 2 #I PVC | Polyolefin of Example 1 reacted cyclohexylacrylate PVC | 2 3 2 | good mixing | opaque | hinges with crease whitening | clean cut | tough rips with whitening |
| X. Example 14, Table 4, Part 2 #K PVC | Polyolefin of Example 1 reacted styrene and methyl acrylate PVC | 3 2 | good mixing | opaque | hinges with crease whitening | clean cut | tough rips with whitening |
| Y. Example 20, Table 9 #D PS | PBD—PE reacted with styrene PS | 3 | not totally mixed | opaque with light spots | snapped but remained attached through the light sections | cracks | irregular tear |
| Z. Example 18, Table 7 #B | Star Block PBD—PS reacted with styrene methyl methacrylate PVC | 1 | mixed well | nearly clear | tough - bends with crease whitening | cuts | tough-whitens as it tears |
| AA. HDPE PVC | HDPE PVC Stabilizer | 4 2.5 2.5 0.1 | banded on the mill but looks unmixed | foamy film (stuck to plate) | no strength broke easily | cuts cleanly | no strength |
| AB. HDPE PVC | HDPE PVC | 2 2 | milled better than AA | white not uniform | little strength | cuts cleanly | weak - stronger than AA |

TABLE 17-continued

Example 30
Small Scale Blends of Pelletized Compositions with other Polymers mixed on a Small Laboratory 2-Roll Mill at 380–390° F. and then Pressed into a Film at 180° C. in a Carver Press.

| Source of Polymer Components | Polymer Components | Ratio | Processing Notes | Film Appearance | Result on Bending Film | Result on Cutting Film | Result on Tear at end of Cut |
|---|---|---|---|---|---|---|---|
| Example 11B | Polyolefin of Example 1 reacted with vinyl chloride as in Example 11B | 1 | some sticking of film | | | | |
| AC. HDPE | HDPE | 1.5 | reasonable mill mixing-slight sticking of film | translucent | crease whitened hinged-no break | easy to cut | tears with whitening |
| PVC | PVC | 2 | | | | | |
| Example 13D prepared according to Example 6 | EPDM—HDPE (2:1) reacted with vinyl chloride | 1.5 | | | | | |

I claim:

1. A graft polymer of an ethylenically unsaturated polymerizable monomer in the liquid state, polymerized with a polymer of an unsubstituted, aliphatic hydrocarbon monoolefin of 2 to about 8 carbon atoms blended with at least one different polymer derived from unsaturated reactants, which blend is in the solid state and which is substantially insoluble in the monomer but absorbs a substantial amount of the monomer, wherein the different polymer facilitates the liquid monomer absorption without dissolving the polymer blend.

2. The graft polymer of claim 1 wherein the weight average molecular weight of the monoolefin polymer is in the range of about 10,000 to about 1,000,000.

3. The graft polymer of claim 1 wherein the weight average molecular weight of the monoolefin polymer is in the range of about 80,000 to about 300,000.

4. The graft polymer of claim 1 wherein the proportion of monoolefin polymer blend in said graft polymer is about 20 to about 80 weight percent based on the weight of said monomer.

5. The graft polymer of claim 1 wherein the proportion of monoolefin polymer blend in said graft polymer is about 30 to about 50 weight percent based on the weight of said monomer.

6. The graft polymer of claim 1 prepared in a mass polymerization process.

7. The graft polymer of claim 1 prepared in a polymerization process in the presence of an inert diluent.

8. The graft polymer of claim 1 prepared in a polymerization process in the presence of water.

9. A graft polymer of an ethylenically unsaturated polymerizable monomer in the liquid state, polymerized with a blend of ethylene propylene polyene modified polymer and high density polyethylene which is in the solid state and which is substantially insoluble in the monomer but absorbs a substantial amount of the monomer.

10. The graft polymer of claim 9 wherein the polyene is an aliphatic hydrocarbon non-conjugated polyene of 5 to about 18 carbon atoms.

11. The graft polymer of claim 9 wherein the polyene is ethylidene norbornene.

12. The graft polymer of claim 9 wherein the polyene is 1,4-hexadiene.

13. The graft polymer of claim 9 wherein the polyene is bicyclo(2.2.1)hepta-2,5-diene.

14. The graft polymer of claim 1 wherein the monoolefin polymer is a high density polyethylene and the different polymer is polybutadiene.

15. The graft polymer of claim 1 wherein the monoolefin polymer is a high density polyethylene and the different polymer is an ethylene propylene copolymer.

16. The graft polymer of claim 1 wherein the monoolefin polymer is high density polyethylene and the different polymer is a styrene butadiene block polymer.

17. The graft polymer of claim 1 wherein the monoolefin polymer is an ethylene propylene polyene modified polymer, and the different polymer is polymethylmethacrylate.

18. The graft polymer of claim 1 wherein the monomer is a single compound.

19. The graft polymer of claim 18 wherein the monomer is vinyl chloride.

20. The graft polymer of claim 18 wherein the monomer is styrene.

21. The graft polymer of claim 18 wherein the monomer is methyl methacrylate.

22. The graft polymer of claim 18 wherein the monomer is butyl acrylate.

23. The graft polymer of claim 1 wherein the monomer is two or more compounds.

24. The graft polymer of claim 23 wherein the monomer is a mixture of compounds.

25. The graft polymer of claim 24 wherein the monomer is a mixture of styrene and acrylonitrile.

26. The graft polymer of claim 24 wherein the monomer is a mixture of styrene and methyl methacrylate.

27. The graft polymer of claim 24 wherein the monomer is a mixture of styrene and maleic anhydride.

28. The graft polymer of claim 24 wherein the monomer is a mixture of styrene and butyl maleate.

29. The graft polymer of claim 23 wherein the monomers are reacted sequentially with the monoolefin polymer blend.

30. The graft polymer of claim 29 wherein methyl methacrylate is first reacted with the monoolefin polymer blend followed by vinyl chloride.

31. The graft polymer of claim 29 wherein vinyl chloride is first reacted with the monoolefin polymer blend, followed by methyl methacrylate.

32. The graft polymer of claim 1 and a stabilizer.

33. The graft polymer of claim 32 wherein the stabilizer is a dialkyltin maleate.

34. The graft polymer of claim 32 wherein the stabilizer is a dioctyltin maleate dissolved in an alcohol.

35. A vinyl halide polyolefin graft polymer wherein the vinyl halide alone or in combination with up to 50 percent by weight based on the total weight of monomer of an ethylenically unsaturated compound copolymerizable therewith, and in the liquid state, is polymerized with a polymer of an aliphatic hydrocarbon monoolefin of 2 to about 8 carbon atoms blended with at least one different polymer derived from unsaturated reactants, which blend is in the solid state and is substantially insoluble in the monomer but absorbs a substantial amount of the monomer, wherein the different polymer facilitates the liquid monomer absorption without dissolving the polymer blend.

36. The graft polymer of claim 35 wherein the weight average molecular weight of the monoolefin polymer is in the range of about 10,000 to about 1,000,000.

37. The graft polymer of claim 35 wherein the weight average molecular weight of the monoolefin polymer is the range of about 80,000 to about 300,000.

38. The graft polymer of claim 35 wherein the proportion of monoolefin polymer blend in said graft polymer is about 20 to about 80 weight percent based on the weight of said monomer.

39. The graft polymer of claim 35 wherein the proportion of monoolefin polymer blend in said graft polymer is about 30 to about 50 weight percent based on the weight of said monomer.

40. The graft polymer of claim 35 prepared in a mass polymerization process.

41. The graft polymer of claim 35 prepared in a polymerization process in the presence of an inert diluent.

42. The graft polymer of claim 35 prepared in a polymerization process in the presence of water.

43. A vinyl halide polyolefin graft polymer wherein the vinyl halide alone or in combination with up to 50 percent by weight based on the total weight of monomer of an ethylenically unsaturated compound copolymerizable therewith, and in the liquid state, is polymerized with a polyolefin which comprises a blend of ethylene propylene polyene modified polymer and high density polyethylene, and which is in the solid state and is substantially insoluble in the monomer but absorbs a substantial amount of the monomer.

44. The graft polymer of claim 43 wherein the ratio of polyene modified polymer to high density polyethylene is between 5 to 95 and 95 to 5.

45. The graft polymer of claim 43 wherein the polyene is an aliphatic hydrocarbon non-conjugated polyene of 5 to about 18 carbon atoms.

46. The graft polymer of claim 43 wherein the polyene is ethylidene norbornene.

47. The graft polymer of claim 43 wherein the polyene is 1,4-hexadiene.

48. The graft polymer of claim 43 wherein the polyene is bicyclo(2.2.1)hepta-2,5-diene.

49. The graft polymer of claim 35 wherein the monoolefin polymer is a high density polyethylene and the different polymer is polybutadiene.

50. The graft polymer of claim 35 wherein the monoolefin polymer is a high density polyethylene and the different polymer is an ethylene propylene copolymer.

51. The graft polymer of claim 35 wherein the monoolefin polymer is a high density polyethylene and the different polymer is a styrene butadiene block polymer.

52. The graft polymer of claim 35 wherein the monomer is a single compound.

53. The graft polymer of claim 52 wherein the monomer is vinyl chloride.

54. The graft polymer of claim 35 wherein the monomer is two or more compounds.

55. The graft polymer of claim 54 wherein the monomer is a mixture of compounds.

56. The graft polymer of claim 55 wherein the vinyl halide is vinyl chloride.

57. The graft polymer of claim 54 wherein the monomers are reacted sequentially to the monoolefin polymer blend.

58. The graft polymer of claim 57 wherein vinyl chloride is first reacted with the monoolefin polymer blend, followed by methyl methacrylate.

59. The graft polymer of claim 35 and a stabilizer.

60. The graft polymer of claim 59 wherein the stabilizer is a dialkyltin maleate.

61. The graft polymer of claim 59 wherein the stabilizer is a dioctyltin maleate mixed with an alcohol.

62. A vinyl chloride polyolefin graft polymer, wherein the vinyl chloride in the liquid state is polymerized with a polyolefin comprised of a mixture of ethylene propylene diene modified polymer and high density polyethylene, that is in the solid state and substantially insoluble in vinyl chloride but absorbs a substantial amount of vinyl chloride.

63. The graft polymer of claim 62 wherein the proportion of polyolefin in said graft polymer is in the range of about 30 to about 50 weight percent based on the weight of vinyl chloride.

64. The graft polymer of claim 62 prepared in a mass polymerization process.

65. A process for producing a graft polymer which comprises:
(1) mixing an ethylenically unsaturated polymerizable monomer in the liquid state with a solid polymer that is substantially insoluble in the monomer, but absorbs a substantial amount of the monomer, and an initiator,
(2) heating the resulting mixture to an elevated temperature,
(3) mixing additional monomer with the product of step (2), and
(4) heating the resulting mixture to an elevated temperature wherein said solid polymer is a polymer of an aliphatic hydrocarbon monoolefin of 2 to about 8 carbon atoms blended with at least one different polymer derived from unsaturated reactants, wherein the different polymer facilitates the liquid monomer absorption without dissolving the polymer blend.

66. The process of claim 65 wherein the proportion of monoolefin polymer blend in the polymer product is about 20 to about 80 weight percent based on the weight of said monomer.

67. The process of claim 65 wherein the proportion of monoolefin polymer blend in the polymer product is about 30 to about 50 weight percent based on the weight of said monomer.

68. The process of claim 65 conducted in a mass polymerization process.

69. The process of claim 65 conducted in the presence of an inert diluent.

70. The process of claim 65 conducted in the presence of water.

71. The process of claim 65 wherein a stabilizer is introduced at the beginning of the reaction.

72. The process of claim 71 wherein the stabilizer is a dialkyltin maleate.

73. The process of claim 72 wherein the stabilizer is a dioctyltin maleate mixed with an alcohol.

74. The process of claim 65 wherein the monomer of step (3) is different than the monomer of step (1).

75. The process of claim 65 wherein the polymer product of step (4) has a lighter color than the polymer product of step (2).

76. The process of claim 65 wherein steps (3) and (4) are repeated sequentially one or more times.

77. A process for producing a vinyl halide polyolefin graft copolymer which comprises reacting vinyl halide alone or in combination with up to 50 percent by weight based on the total weight of monomer of an ethylenically unsaturated monomer copolymerizable therewith, in the liquid state with a solid polyolefin that is substantially insoluble in the monomer but absorbs a substantial amount of the monomer, in the presence of an initiator for the reaction, wherein said polyolefin in a polymer of an aliphatic hydrocarbon monoolefin of 2 to about 8 carbon atoms blended with at least one different polymer derived from unsaturated reactants, wherein the different polymer facilitates the liquid monomer absorption without dissolving the polymer blend.

78. The process of claim 77 wherein the monomer is vinyl chloride.

79. The process of claim 77 wherein the proportion of monoolefin polymer in the polymer product is about 20 to about 80 weight percent based on the weight of said monomer.

80. The process of claim 77 wherein the proportion of monoolefin polymer in the polymer product is about 30 to about 50 weight percent based on the weight of said monomer.

81. The process of claim 77 conducted in a mass polymerization process.

82. The process of claim 77 conducted in the presence of an inert diluent.

83. The process of claim 77 conducted in the presence of water.

84. The process of claim 77 wherein a stabilizer is introduced at the beginning of the reaction.

85. The process of claim 84 wherein the stabilizer is a dialkyltin maleate.

86. The process of claim 84 wherein the stabilizer is a dioctyltin maleate mixed with an alcohol.

87. A process for preparing a vinyl halide polyolefin graft copolymer which comprises:
(1) mixing a monomer component comprising vinyl halide alone or in combination with up to 50 percent by weight based on the total weight of monomer of an ethylenically unsaturated monomer copolymerizable therewith, in the liquid state, with a solid polyolefin comprising a polymer of an aliphatic hydrocarbon monoolefin of 2 to about 8 carbon atoms blended with at least one different polymer derived from unsaturated reactants, which blend is substantially insoluble in the monomer or monomers, but absorbs a substantial amount of the monomer or monomers, wherein the different polymer facilitates the liquid monomer absorption without dissolving the polymer blend; and an initiator, and
(2) heating the resulting mixture at a temperature in the range of about 30 to about 90 degrees Celsius.

88. A process for preparing a vinyl halide polyolefin graft copolymer which comprises:
(1) mixing a monomer component comprising vinyl halide alone or in combination with up to 50 percent by weight based on the total weight of monomer of an ethylenically unsaturated monomer copolymerizable therewith, in the liquid state, with a polyolefin comprising a polymer of an aliphatic hydrocarbon monoolefin of 2 to about 8 carbon atoms blended with at least one different polymer derived from unsaturated reactants, wherein the polyolefin is substantially insoluble in the monomer or monomers, but absorbs a substantial amount of the monomer or monomers, wherein the different polymer facilitates the liquid monomer absorption without dissolving the polymer blend; and an initiator, and
(2) heating the resulting mixture at a temperature in the range of about 30 to about 90 degrees Celsius,
(3) mixing additional monomer component with the product of step (2), and
(4) heating the resulting mixture at a temperature in the range of about 30 to about 90 degrees Celsius.

89. The process of claim 88 wherein the proportion of polyolefin blend in the polymer product of the process is in the range of about 20 to about 80 weight percent based on the weight of vinyl halide.

90. The process of claim 88 wherein the monomer of step (2) is different than the monomer of step (4).

91. The process of claim 90 wherein the polymer product of step (4) has a lighter color than the polymer product of step (2).

* * * * *